US011426682B2

(12) United States Patent
Merrigan et al.

(10) Patent No.: US 11,426,682 B2
(45) Date of Patent: Aug. 30, 2022

(54) SELF-BACK FLUSHING FILTRATION ASSEMBLY

(71) Applicant: GRAYL Inc., Seattle, WA (US)

(72) Inventors: Travis Merrigan, Seattle, WA (US); Andrew Weber, Seattle, WA (US); Kendall Toerner, Cincinnati, OH (US); Geneva Goldwood, Seattle, WA (US); Scott Rolfson, Portland, OR (US)

(73) Assignee: GRAYL INC., Seattle, WA (US)

( * ) Notice: Subject to any disclaimer, the term of this patent is extended or adjusted under 35 U.S.C. 154(b) by 91 days.

(21) Appl. No.: 16/810,534

(22) Filed: Mar. 5, 2020

(65) Prior Publication Data
US 2020/0282344 A1    Sep. 10, 2020

Related U.S. Application Data

(60) Provisional application No. 62/815,837, filed on Mar. 8, 2019.

(51) Int. Cl.
| *B01D 29/68* | (2006.01) |
| *B01D 29/11* | (2006.01) |
| *B01D 29/52* | (2006.01) |
| *B01D 27/08* | (2006.01) |

(52) U.S. Cl.
CPC ............ *B01D 29/68* (2013.01); *B01D 27/08* (2013.01); *B01D 29/114* (2013.01); *B01D 29/52* (2013.01)

(58) Field of Classification Search
CPC .... B01D 29/66; B01D 29/665; B01D 29/668; B01D 29/70; B01D 33/48
See application file for complete search history.

(56) References Cited

U.S. PATENT DOCUMENTS

| 8,394,268 B2 | 3/2013 | O'Brien et al. |
| 8,425,771 B2 | 4/2013 | O'Brien et al. |
| 8,852,439 B2 | 10/2014 | Frauchiger et al. |
| 9,839,868 B2 | 12/2017 | Fritze |
| 2010/0170834 A1 | 7/2010 | Stephens et al. |
| 2017/0266621 A1 | 9/2017 | Barchet |

*Primary Examiner* — Benjamin M Kurtz
(74) *Attorney, Agent, or Firm* — Rowan TELS LLC

(57) ABSTRACT

A self-back flushing filtration assembly includes an inner container, an outer container, and a filter cartridge. The inner container is configured to receive treated water by way of a filter cartridge. The outer container is configured to hold untreated water and sleeve the filter cartridge and the inner container. The inner container and the filter cartridge are moveably positioned within the outer container to compress and draw the untreated water through filter media within the filter cartridge by way of a filter cap. The filter cap is movably positioned within a cavity of the outer container to draw treated water from the inner container through the filter media of the filter cartridge.

6 Claims, 22 Drawing Sheets

SELF-BACK FLUSHING FILTRATION ASSEMBLY

CROSS-REFERENCE TO RELATED APPLICATIONS

This application claims the benefit of U.S. provisional patent application Ser. No. 62/815,837, filed on Mar. 8, 2019, the contents of which are incorporated herein by reference in their entirety.

BACKGROUND

Potable water is an essential resource for human survival. Drinking untreated water may lead to sickness or death caused by pathogens including bacteria, protozoa, and virus. In remote locations where water has not been treated, or in locations where water treatment is insufficient to remove possible pathogens, a method is needed to render it potable.

One such method uses a filter membrane with small pores to pass water but block contaminants, such as pathogens, sediment, and organic colloids. Physical filtration is preferred over other methods due to its ability to remove contaminants rather than simply rendering them inert. One challenge with physical filtration is that over time, the filter pores become clogged by the contaminants they remove, thus decreasing the clean water output of the filter. It is possible to dislodge some of these contaminants by reversing the flow through, or back flushing, the filter. This may require supplementary tools such as syringes or pumps for consumers to use for this maintenance at their discretion.

When maintenance is not performed regularly, such as when the user doesn't understand the need for it, doesn't wish to carry the necessary tools due to their weight or available packing space, or doesn't wish to remove the filter from service, the filter may become clogged and rendered unusable, leaving the user without a source for potable water in a remote location. Therefore, a need exists for improving filter maintenance.

BRIEF SUMMARY

A self-back flushing filtration assembly comprises an inner container configured to receive treated water by way of a filter cartridge, and an outer container configured to hold untreated water and sleeve the filter cartridge and the inner container. The inner container and the filter cartridge are moveably positioned within the outer container to compress and draw the untreated water through filter media within the filter cartridge by way of a filter cap. The filter cap is movably positioned within a cavity of the outer container to draw the treated water from at least one of the inner container or the filter media, through the filter media of the filter cartridge.

A method comprises operating a self-back flushing filtration assembly to filter untreated water where the self-back flushing filtration assembly includes an inner container configured to receive treated water by way of a filter cartridge, wherein the filter cartridge comprises filter media to capture particles and a first seal. An outer container is configured to hold the untreated water and sleeve the filter cartridge and the inner container. The inner container and the filter cartridge are moveably positioned within the outer container to compress and draw the untreated water through the filter media within the filter cartridge by way of a filter cap, wherein the filter cap or the outer container comprises a second seal, wherein the untreated water is sealed between the filter cartridge and a cavity of the outer container by way of the first seal on the filter cartridge. The filter cap is movably positioned within the cavity of the outer container to draw the treated water from the inner container or a treated portion of the filter media, through the filter media of the filter cartridge, wherein the cavity is sealed by the second seal on the filter cap or the outer container. The self-back flushing filtration assembly is operated to draw the treated water from the inner container or the treated portion of the filter media, through the filter media of the filter cartridge, thereby dislodging captured particles from the filter media.

A self-back flushing filtration assembly comprises an inner container configured to receive treated water by way of a filter cartridge and an outer container configured to hold untreated water and sleeve the filter cartridge and the inner container. The inner container and the filter cartridge are moveably positioned within the outer container to compress and draw the untreated water through filter media within the filter cartridge by way of a filter cap. The filter cap is movably positioned within a back flushing base attached to the filter cartridge. The back flushing base is sleeved by the outer container, the back flushing base is configured to receive the filter cartridge, and the back flushing base allows fluid communication between the filter cap and a bottom portion of the outer container to draw the treated water from at least one of the inner container or the filter media, through the filter media of the filter cartridge.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
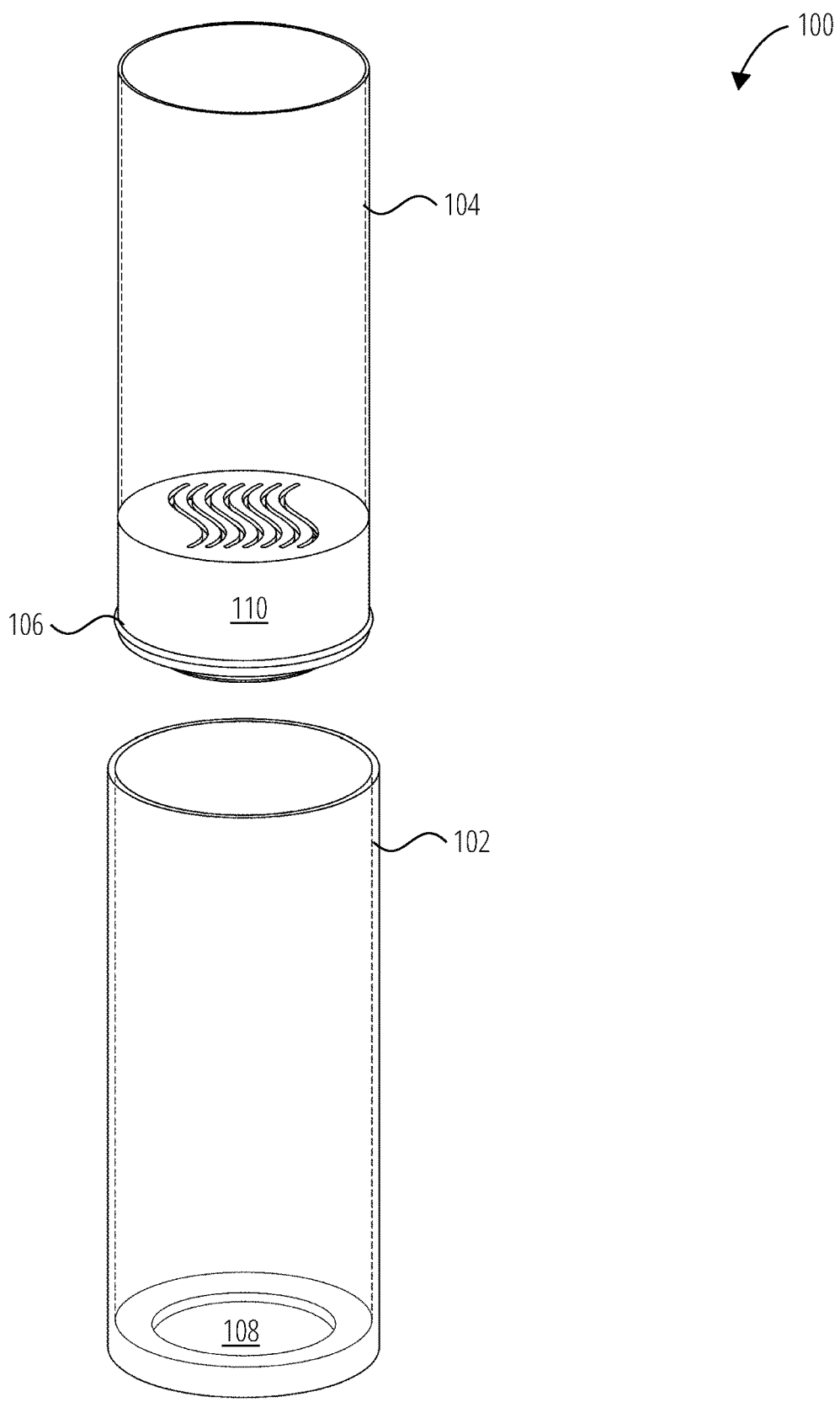
FIG. 1 illustrates a self-back flushing filtration assembly 100 in accordance with one embodiment.
Figure 2:
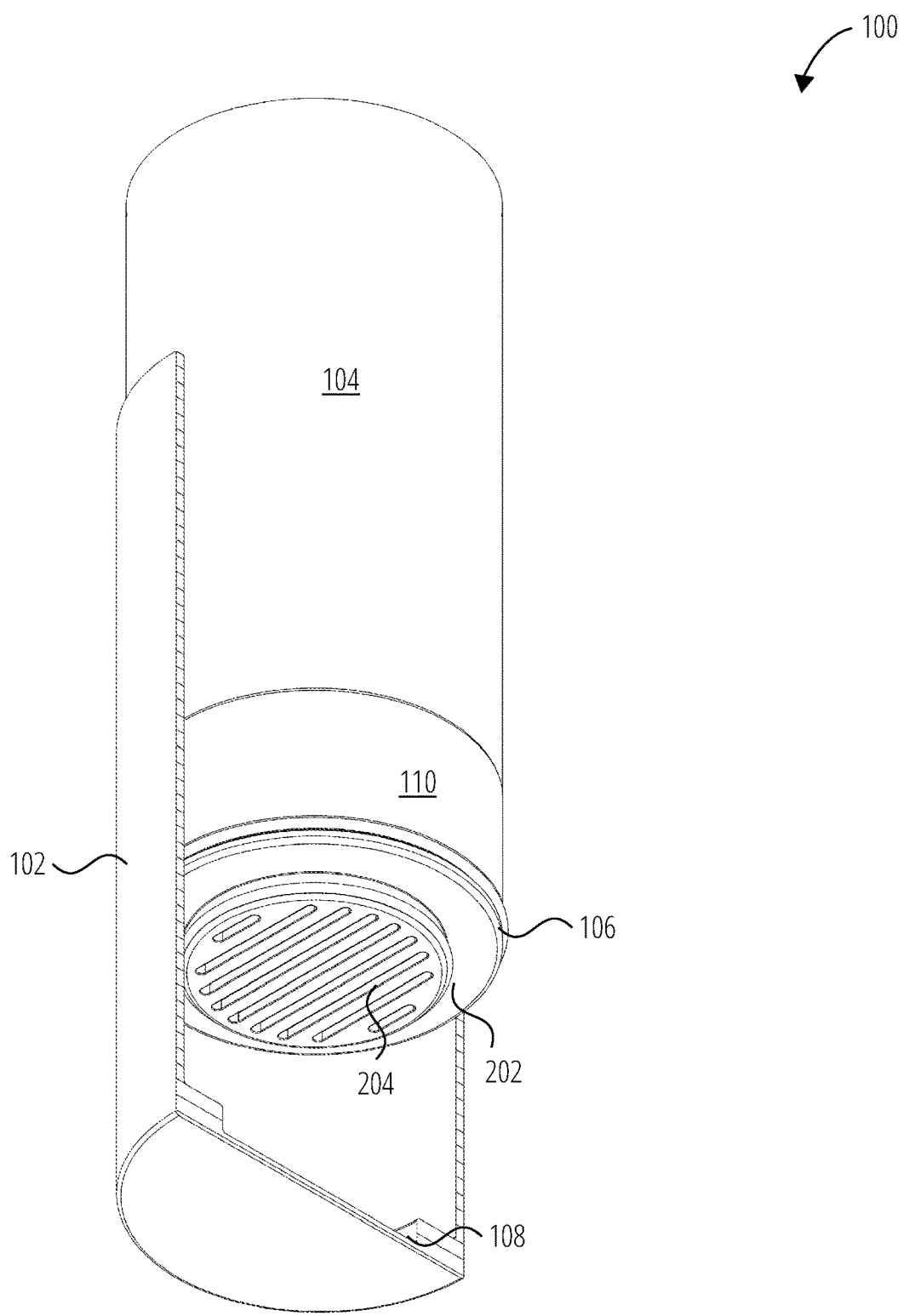
FIG. 2 illustrates a partial sectional view of a self-back flushing filtration assembly 100 in accordance with one embodiment.
Figure 3:
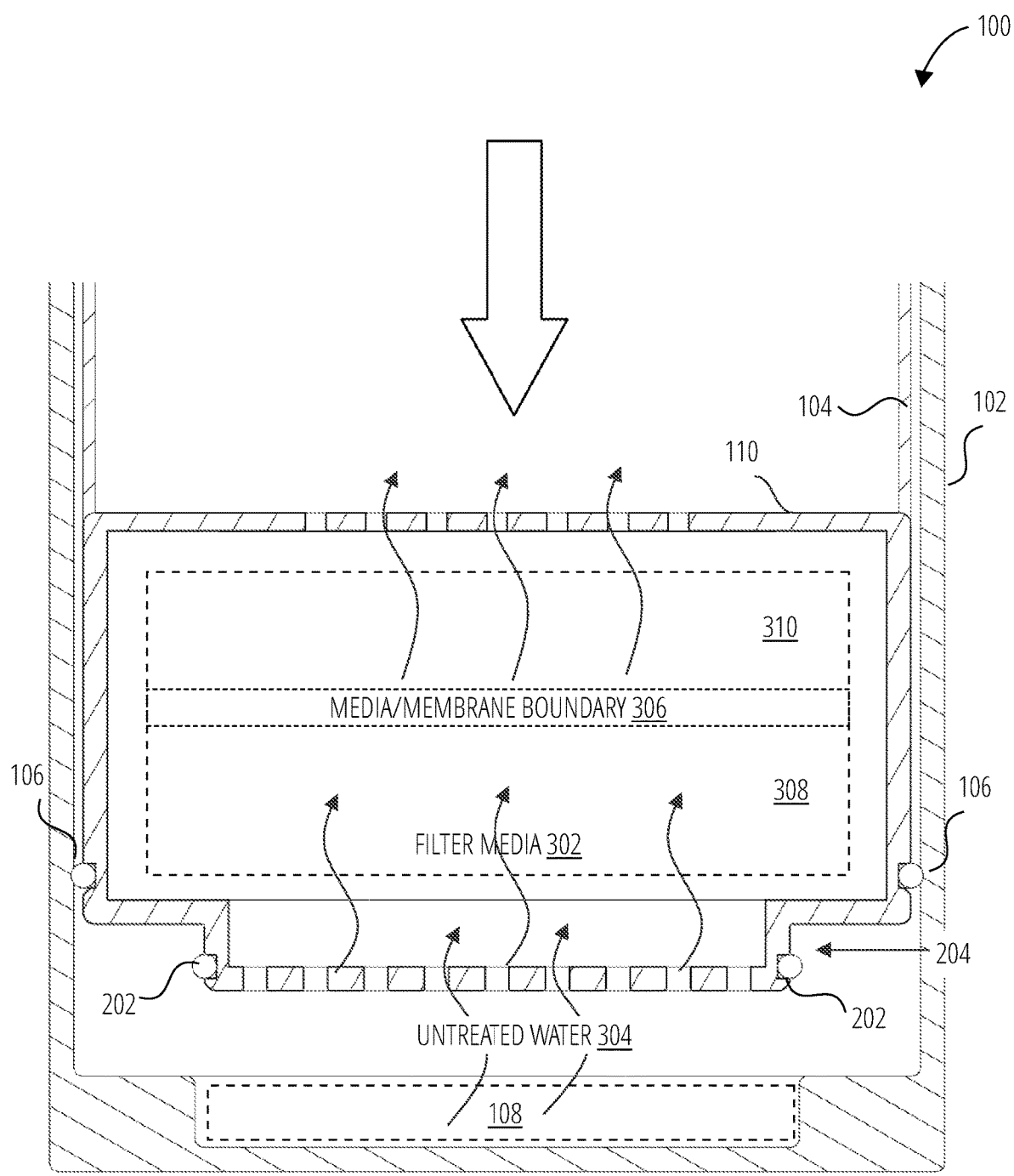
FIG. 3 illustrates a sectional view of a self-back flushing filtration assembly 100 in accordance with one embodiment.
Figure 4:
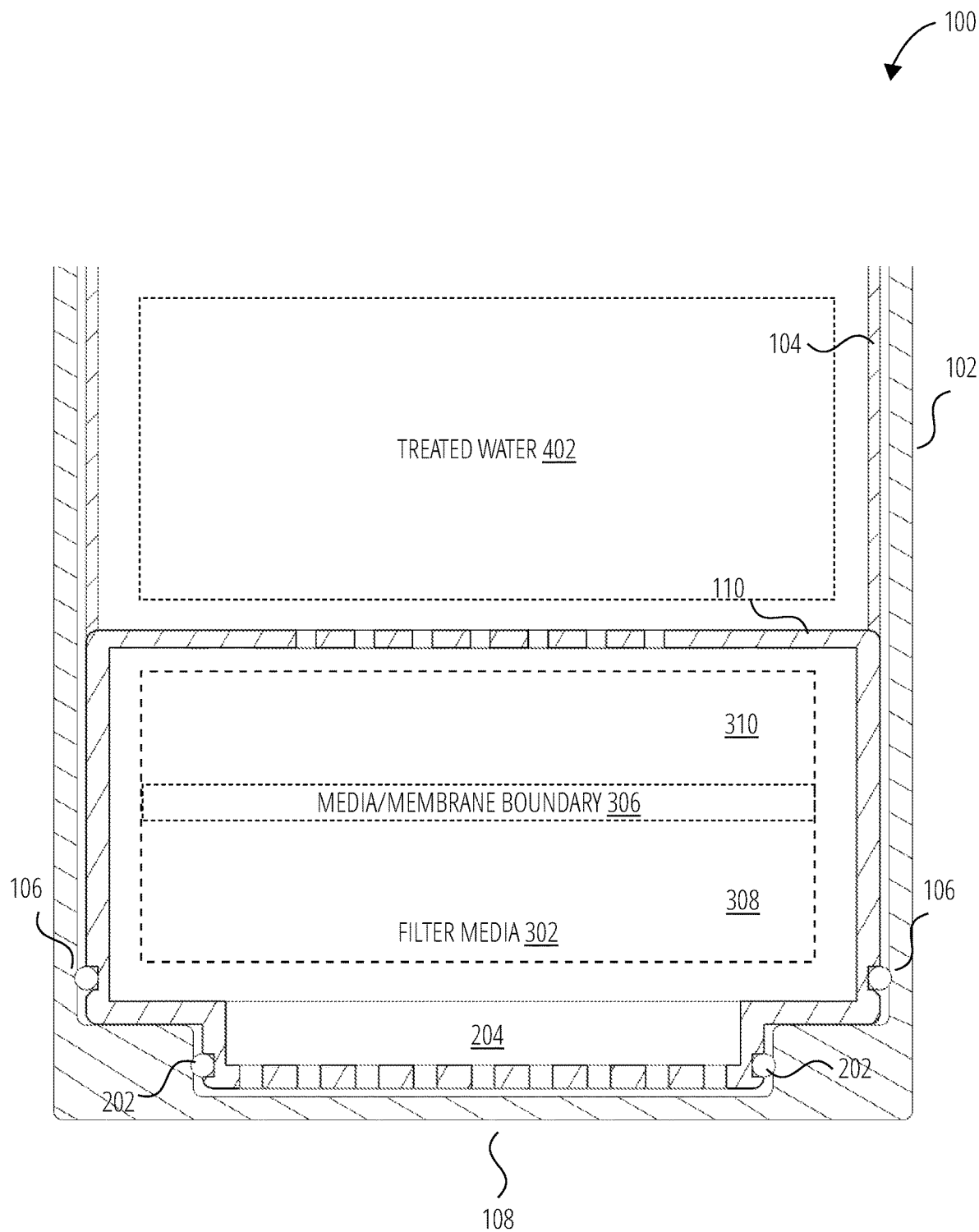
FIG. 4 illustrates a sectional view of a self-back flushing filtration assembly 100 in accordance with one embodiment.
Figure 5:
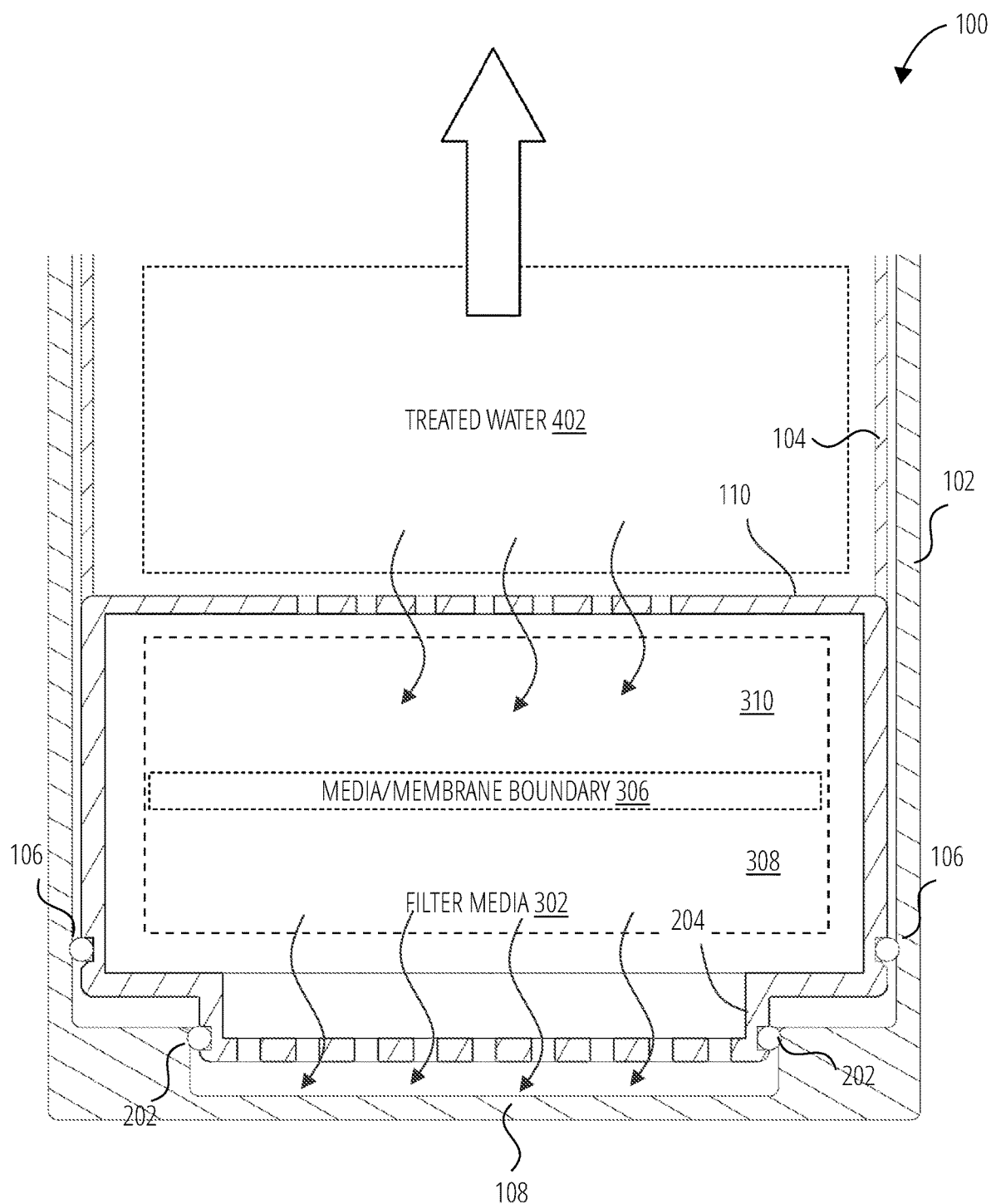
FIG. 5 illustrates a sectional view of a self-back flushing filtration assembly 100 in accordance with one embodiment.
Figure 6:
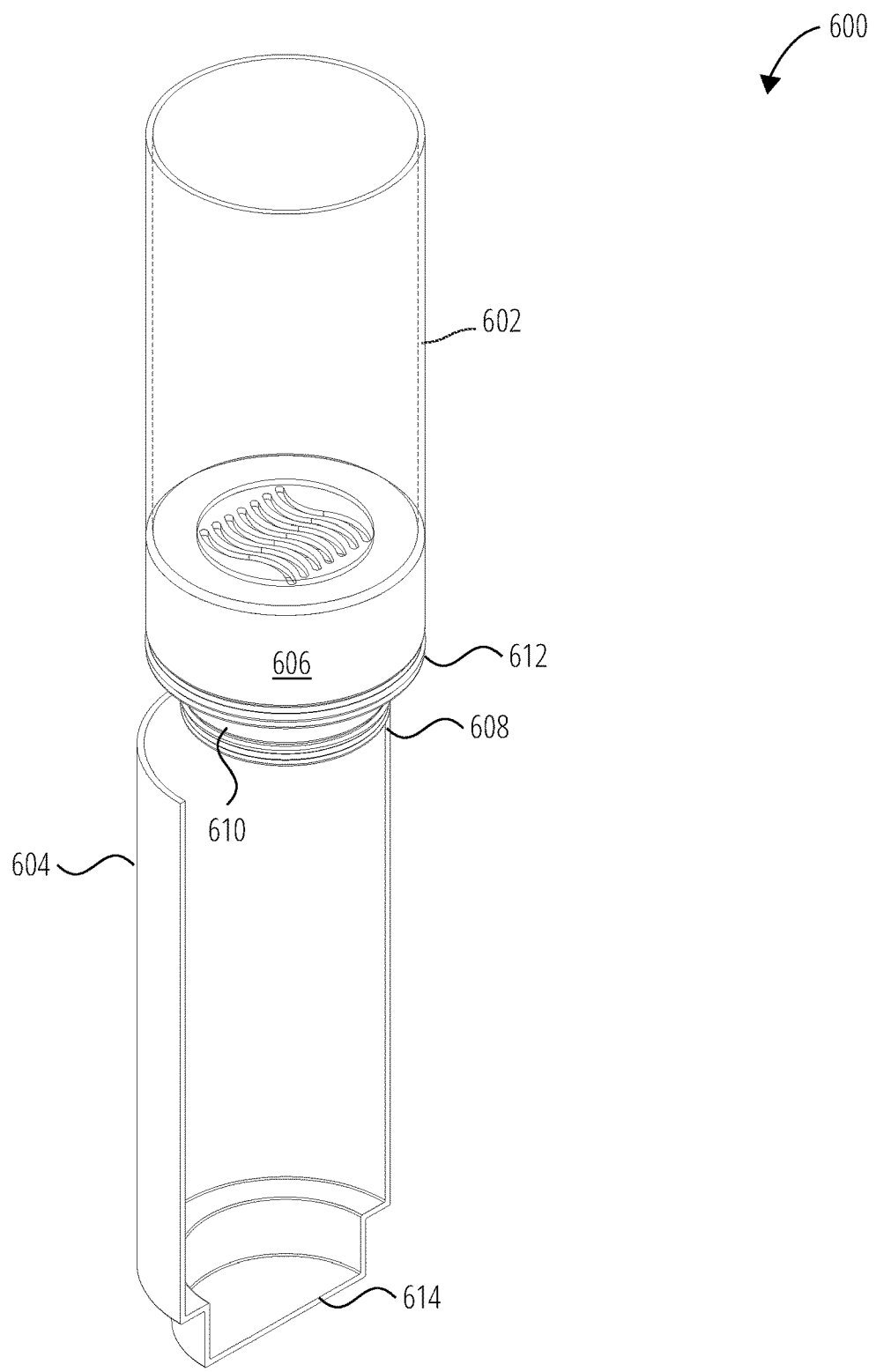
FIG. 6 illustrates a partial sectional view of a self-back flushing filtration assembly 600 in accordance with one embodiment.
Figure 7:
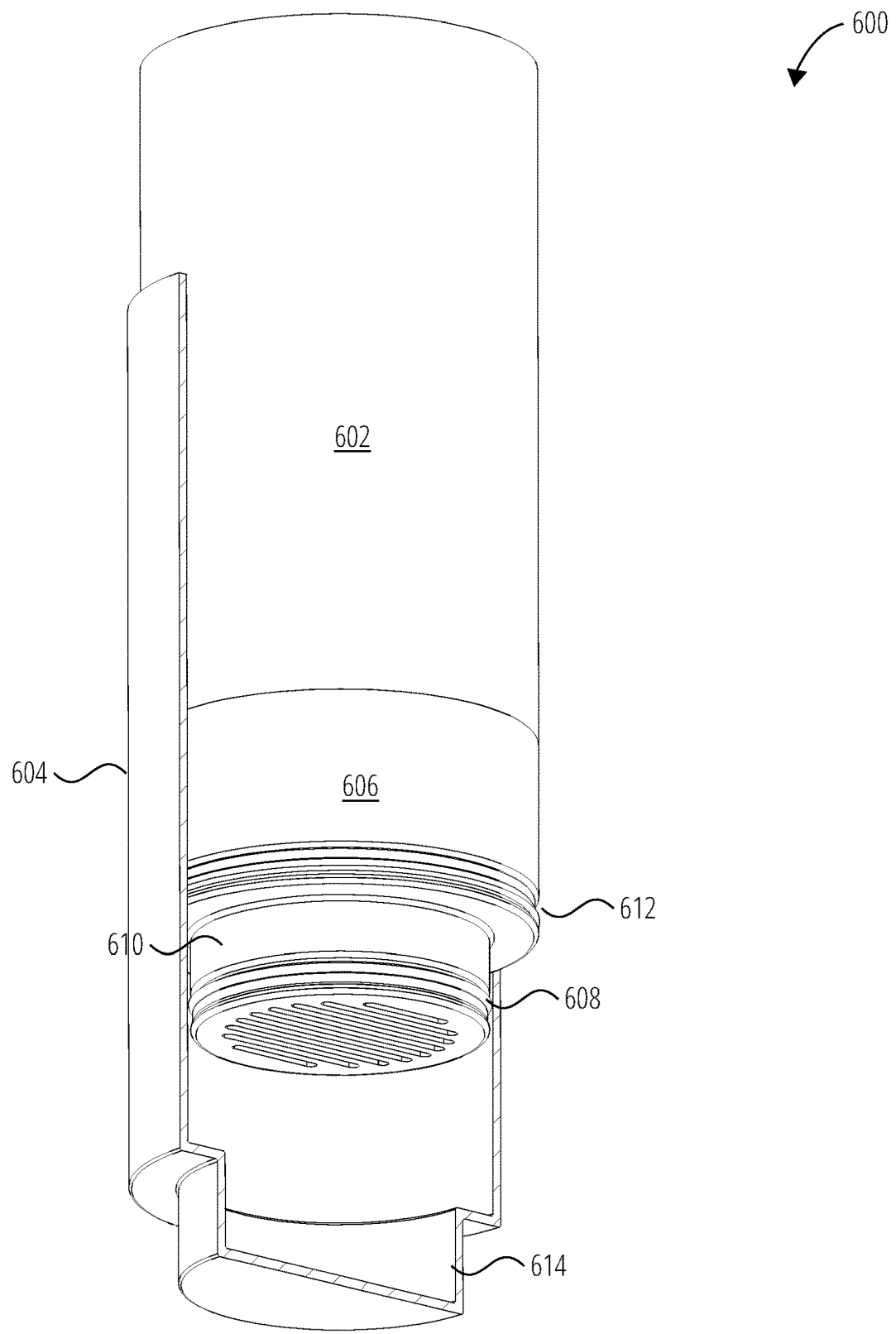
FIG. 7 illustrates a partial sectional view of a self-back flushing filtration assembly 1600 in accordance with one embodiment.

A self-back flushing filtration assembly may include an outer container and an inner container coupled to a filter cartridge. The inner container may be cylindrical in shape and configured to engage the filter cartridge to form a sealed container for receiving treated water by way of a filter cartridge. The outer container may be configured to hold untreated water and sleeve the filter cartridge and the inner container. The inner container and the filter cartridge may be moveably positioned within the outer container to compress and draw the untreated water through filter media within the filter cartridge by way of a filter cap. The filter cap may be movably positioned within a cavity of the outer container to draw the treated water from at least one of the inner container or the filter media, through the filter media of the filter cartridge. The filter cap may serve as the portion of the filter cartridge that initially contacts untreated water and receives the untreated water into the filter cartridge to contact that filter media. The filter cap may also provide a mounting point for a set of ring seals that modify the pressure of the enclosed space formed between the filter cartridge and portions of the outer container.

In some configurations, the untreated water may be sealed between the filter cartridge and the cavity of the inner container by way of a first seal on the filter cartridge.

In some configurations, the cavity may be sealed by a second seal on the filter cap.

In some configurations, the cavity may be sealed by a second seal on the outer container.

In some configurations, the self-back flushing filtration assembly may include a first seal and a second seal. The first seal is on the filter cartridge, wherein the untreated water may be sealed between the filter cartridge and the cavity of the inner container by way of the first seal. The second seal is on the filter cap or on the outer container, wherein the cavity may be sealed by the second seal. The first seal and the second seal may be unidirectional seals. The first seal and the second seal may be opposing unidirectional seals.

In some configurations, the self-back flushing filtration assembly does not include a check valve. Such check valves may operate to allow unidirectional flow during normal operating conditions (i.e., filtration activities), or during back flushing activities. In additional configurations, the self-back flushing filtration assembly does not include a valve of any type that may operate to provide unidirectional fluid flow during normal operating conditions (i.e., filtration activities) or during back flushing activities.

A method of operating the self-back flushing filtration assembly may involve operating a self-back flushing filtration assembly to filter untreated water and operating the self-back flushing filtration assembly to draw the treated water from the inner container or treated portion of the filter media, through the filter media of the filter cartridge, thereby dislodging captured particles from the filter media.

The self-back flushing filtration assembly may include an inner container, and an outer container. The inner container may be configured to receive treated water by way of a filter cartridge, wherein the filter cartridge includes filter media to capture particles, and a first seal. The outer container may be configured to hold the untreated water and sleeve the filter cartridge and the inner container. The inner container and the filter cartridge may be moveably positioned within the outer container to compress and draw the untreated water through the filter media within the filter cartridge by way of a filter cap. The filter cap or the outer container may include a second seal, wherein the untreated water may be sealed between the filter cartridge and the cavity of the outer container by way of the first seal on the filter cartridge. The filter cap may be movably positioned within a cavity of the outer container to draw the treated water from the inner container or treated portion of the filter media, through the filter media of the filter cartridge, wherein the cavity may be sealed by the second seal on the filter cap or the outer container.

In some configurations, operating the self-back flushing filtration assembly to draw the treated water from the inner container or treated portion of the filter media, through the filter media of the filter cartridge, creates a negative pressure between the filter cartridge and the cavity.

In some configurations, the negative pressure may be created by moving the second seal in a direction out of the cavity, wherein the second seal may be in contact with a portion of the cavity. The first seal and second seal may be unidirectional seals. The first seal and second seal may be opposing unidirectional seals.

The method of operating the self-back flushing filtration assembly may involve forming a piston from the inner container, the outer container, and the filtration cartridge, where the filtration cartridge and the inner container serve as the plunger, and the outer container serves as the barrel. The outer container may contain untreated water that during the compression of the plunger forces the untreated water through the filtration cartridge to filter the water. The treated water is then collected through the opposite side of the filtration cartridge in the inner container. When the plunger reaches the bottom of the outer container, a seal may temporarily engage creating negative pressure within the barrel when the plunger is pulled out. The negative pressure may draw treated water or water left in the filtration media of the filter cartridge out, back flushing the filtration cartridge.

In an embodiment, the self-back flushing filtration assembly may include an inner container and an outer container. The inner container may be configured to receive treated water by way of a filter cartridge. The outer container may be configured to hold untreated water and sleeve the filter cartridge and the inner container. The inner container and the filter cartridge may be moveably positioned within the outer container to compress and draw the untreated water through filter media within the filter cartridge by way of a filter cap. The filter cap may be movably positioned within a back flushing base attached to the filter cartridge. The back flushing base may be sleeved by the outer container, the back flushing base may be configured to receive the filter cartridge, and the back flushing base allows fluid communication between the filter cap and a bottom portion of the outer container to draw the treated water from at least one of the inner container or the filter media, through the filter media of the filter cartridge.

In some configurations, the self-back flushing filtration assembly may include a first seal and a second seal. The first seal on the filter cartridge, wherein the untreated water may be sealed between the filter cartridge and the back flushing base by way of the first seal. The back flushing base seal on the back flushing base, the back flushing base seal contacting the outer container, wherein the bottom portion of the outer container may be sealed by the back flushing base seal. The first seal and the back flushing base seal may be unidirectional seals. The first seal and the back flushing base seal may be opposing unidirectional seals.

In some configurations, the self-back flushing filtration assembly may be operated to draw the treated water from the inner container or treated portion of the filter media, through the filter media of the filter cartridge, creates a negative pressure between the filter cap, the back flushing base, and the outer container.

Referencing FIG. 1 through FIG. 5 a self-back flushing filtration assembly 100 is provided as a water filtration system that forces untreated water 304 from an outer container 102 through a filter cartridge 110 into an inner container 104. When the filter cartridge 110 is pushed to the bottom of the outer container 102, a filter cap 204 enters a cavity 108 forming a piston. In an embodiment, as the filter cartridge 110 and the inner container 104 are pulled out of the outer container 102, a negative pressure area is formed between the cavity 108 and the filter cap 204 that draws treated water 402 remaining in the post-filtered interstitial space 310 of the filter cartridge 110, effectively back flushing the filter. In another embodiment, as the filter cartridge 110 and the inner container 104 are pulled out of the outer container 102, a negative pressure area is formed between the cavity 108 and the filter cap 204 that draws treated water 402 from the inner container 104 and/or the post-filtered interstitial space 310 in the filter cartridge 110, effectively back flushing the filter.

The self-back flushing filtration assembly 100 comprises the inner container 104, filter cartridge 110, and the outer container 102. The filter cartridge 110 is engaged to the lateral walls of the inner container 104 such that the filter cartridge 110 forms the bottom of the inner container 104. The inner container 104 and the filter cartridge 110 are sleeved by the outer container 102.

The filter cartridge 110 comprises a first ring seal 106, a filter media 302 positioned within the filter cartridge 110, and a filter cap 204 comprising a second ring seal 202. The filter cap 204 is concentrically positioned opposite the inner container 104 on the filter cartridge 110. The first ring seal 106 is a floating (two-way) seal that is engaged when pressing down (water is pushed) but disengages (releases) when pulled up (extraction) to release the seal and allowing air to flow into the vacated space within the outer container 102.

The second ring seal 202 may be a non-floating seal or a floating seal. In one embodiment, unlike the first ring seal 106, the second ring seal 202 is a non-floating seal that engages and forms a seal when the filter cap 204 enters the cavity 108 of the outer container 102. In another embodiment, the second ring seal 202 is a floating seal that is oriented in the opposite direction from the first ring seal 106.

In an embodiment, the filter cartridge 110 is removable from the inner container 104. The filter cartridge 110 may be screwed into a portion of the inner container 104 that includes threads to receive the filter cartridge 110. In additional embodiments, the filter cartridge 110 is part of the inner container 104 and cannot separately be removed from the inner container 104.

The filter cap 204 includes fluid passages allowing untreated water 304 to contact the filter media 302 in the pre-filtered interstitial space 308 for treatment when a downwards force is applied to the inner container 104 and the filter cartridge 110. The treated water 402 then exits the filter media 302 and the filter cartridge 110 into the inner container 104 through fluid passages found opposite the fluid passages of the filter cap 204.

The treated water is any water that has passed through the media/membrane boundary 306 into the post-filtered interstitial space 310. The media/membrane boundary 306 represents a boundary within the filter media 302 of the filter cartridge 110 where there is a separation of untreated water from treated water (i.e., "clean water"). The space on the untreated water 304 side of the filter media 302 is referred to as the pre-filtered interstitial space 308. The space on the treated water 402 side of the filter media 302 is referred to as the post-filtered interstitial space 310.

During operation of the self-back flushing filtration assembly 100, outer container 102 receives a volume of untreated water 304. The inner container 104 and the filter cartridge 110 are then inserted into the outer container 102 with the filter cap 204 positioned towards the untreated water 304 and the cavity 108. The first ring seal 106 of the filter cartridge 110 engages the lateral walls of the outer container 102 forming a sealed chamber. As the inner container 104 and the filter cartridge 110 are pushed towards the cavity 108, the volume of the sealed chamber is reduced forcing the fluids in the sealed chamber (i.e., the untreated water 304 and trapped air) to flow through the fluid passages on the filter cap 204. The untreated water 304 is then treated as it passes through the filter media 302 and exits filter cartridge 110 into the inner container 104 as treated water 402. As the filter cap 204 enters the cavity 108, the second ring seal 202 engages the lateral walls of the cavity 108 forcing any untreated water 304 in the cavity 108 to traverse the filter cartridge 110. After the untreated water 304 has been treated, the filter cartridge 110 and the inner container 104 are extracted from the outer container 102. During the extraction, the first ring seal 106 releases its seal allowing air to enter the vacated space where the untreated water 304 was found previously. During the extraction, the second ring seal 202 forms a seal with the cavity 108 creating a vacuum in the cavity 108 as the filter cap 204 is extracted. The vacuum formed in the cavity 108 by extraction of the filter cap 204 draws treated water 402 from the inner container 104 an/or the post-filtered interstitial space 310 of the filter media 302, through the filter media 302 and into the cavity 108. The movement of the treated water 402 from the inner container 104 to the cavity 108 flushes the filter media 302. When the second ring seal 202 disengages the lateral wall of the cavity 108, the negative pressure formed by the vacuum in the cavity 108 is reduced, stopping treated water 402 from being drawn into the outer container 102.

In some non-limiting configurations, the negative pressure formed in the cavity 108 by the filter cap 204 and second ring seal 202 draws a small quantity (approximately 10-25 ml) of treated water 402 back thru the filter cartridge 110 to dislodge impurities and improving the flow for the next press.

As a non-limiting example, pressing down the filter cartridge 110 and the inner container 104 may treat a certain quantity of water where a portion of the treated water 402 may be utilized to back flush the filter media 302 within the filter cartridge 110. Furthermore, since the filter cartridge 110 of the self-back flushing filtration assembly 100 performs a back flush after every use, the life of the filter media 302 may be prolonged, and may reduce or eliminate the need for additional field maintenance.

A method of using a self-back flushing filtration assembly may include operating a self-back flushing filtration assembly to filter untreated water. The self-back flushing filtration assembly may comprise an inner container being configured to receive treated water by way of a filter cartridge, wherein the filter cartridge comprises filter media to capture particles and a first seal. An outer container is configured to hold the untreated water and sleeve the filter cartridge and the inner container, and the inner container and the filter cartridge are moveably positioned within the outer container to compress and draw the untreated water through filter media within the filter cartridge by way of a filter cap, wherein the filter cap comprises a second seal. The untreated water may be sealed between the filter cartridge and the cavity of the outer container by way of the first seal on the filter cartridge. The filter cap may be movably positioned within a cavity of the outer container to draw the treated water from the inner container and/or the clean portion of the filter cartridge, through the filter media of the filter cartridge. The method also includes operating the self-back flushing filtration assembly to draw the treated water in the cavity through the filter cartridge.

Operating the self-back flushing filtration assembly to draw from the inner container or treated portion of the filter media, through the filter media of the filter cartridge, thereby dislodging captured particles from the filter media. The negative pressure may be created by moving the second seal in a direction out of the cavity, wherein the second seal is in contact with a portion of the cavity.

The self-back flushing filtration assembly is related to the filtration container assembly described in US20140008310A1, which is hereby incorporated by reference herein in its entirety.

FIG. 6 through FIG. 10 illustrates a self-back flushing filtration assembly 600 in accordance with one embodiment. The self-back flushing filtration assembly 600 is provided as a water filtration system that forces untreated water 802 from an outer container 604 through a filter cartridge 606 into an inner container 602. When the filter cartridge 606 is pushed to the bottom of the outer container 604, a filter cap 610 enters a cavity 614 forming a piston. In an embodiment, as the filter cartridge 606 and the inner container 602 are pulled out of the outer container 604, a negative pressure area is formed between the cavity 614 and the filter cap 610 that draws treated water 804 remaining in the post-filtered interstitial space or filter media 806 of the filter cartridge 606, effectively back flushing the filter. In another embodiment, as the filter cartridge 606 and the inner container 602 are pulled out of the outer container 604, a negative pressure area is formed between the cavity 614 and the filter cap 610 that draws treated water 804 from the inner container 602 and/or the post-filtered interstitial space in or filter media 806 of the filter cartridge 606, effectively back flushing the filter.

The first ring seal 612 may be positioned on the filter cartridge 606 adjacent to the filter cap 610. The first ring seal 612 may be "Y" shaped in its cross sectional profile in order to operate as a unidirectional seal. When the forked portions of the seal are positioned facing towards the cavity 614, the first ring seal 612 forms a seal with the walls of the outer container 604 when the inner container 602 is pushed towards the cavity 614. When the inner container 602 and the filter cartridge 606 are retracted, the forked portions of the seal are compressed and allow air to enter the enclosed portion of the outer container 604.

The cavity 614 of the outer container 604 may be a formed portion that extends from the bottom of the outer container 604. The depth of the cavity 614 may be configured such that it accepts the height of the filter cap 610.

Figure 8:
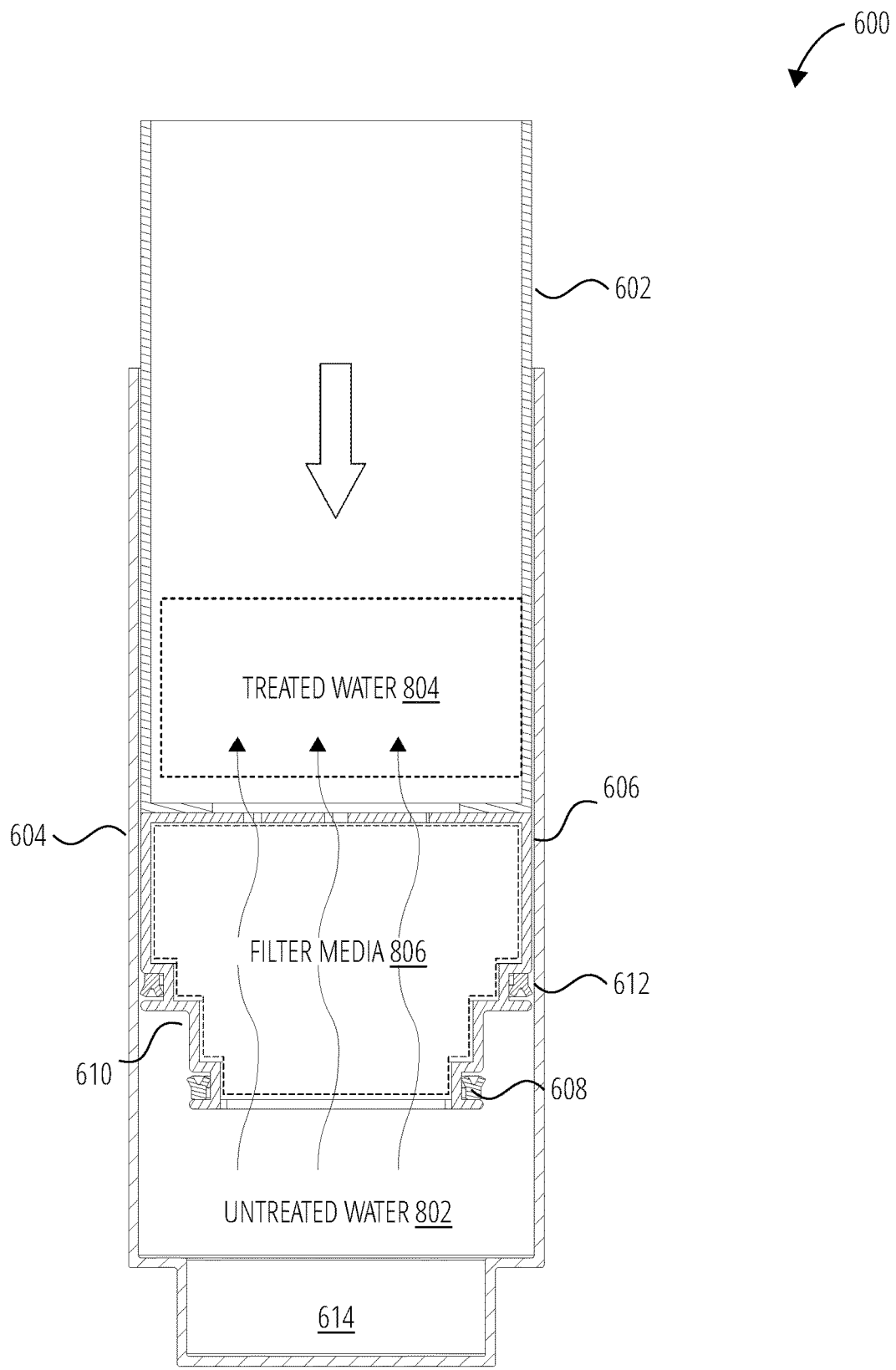
FIG. 8 illustrates a self-back flushing filtration assembly 600 in accordance with one embodiment.

FIG. 8 illustrates the self-back flushing filtration assembly 600 being operated to filter untreated water 802 by compressing the filter cartridge 606 and the inner container 602 with the outer container 604 containing untreated water 802. When the filter cartridge 606 and the inner container 602 are forced into the outer container 604, the first ring seal 612 engages the lateral walls of the outer container 604 forming a seal. The untreated water 802 is then channeled through openings in the filter cap 610 that lead to the filter media 806. When the untreated water 802 passes through the filter media 806, particulates are captured by the filter media 806 filtering the untreated water 802. The filtered water then flows out of the filter cartridge 606 and is collected within the inner container 602 as treated water 804.

Figure 9:
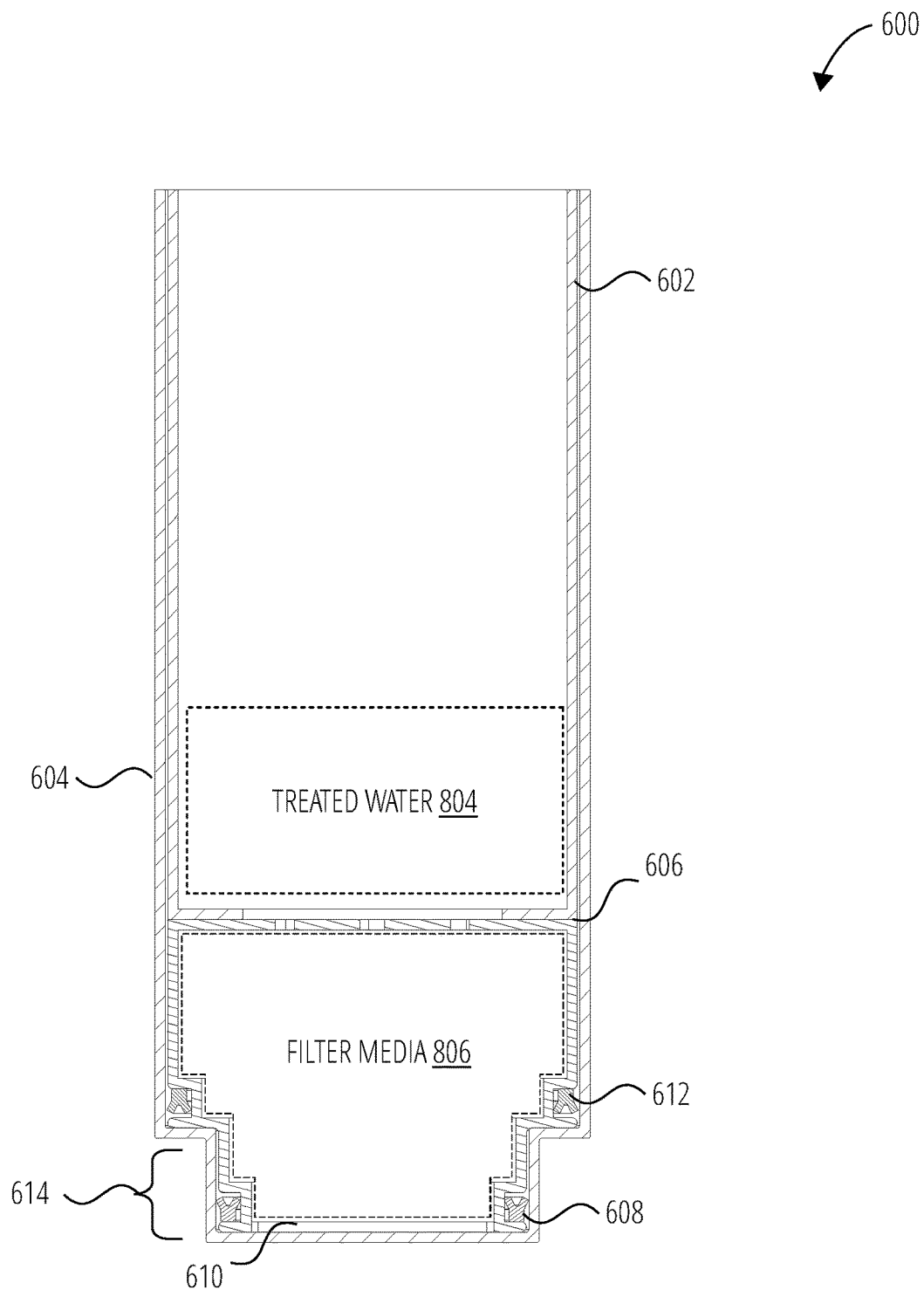
FIG. 9 illustrates a self-back flushing filtration assembly 600 in accordance with one embodiment.

FIG. 9 illustrates the self-back flushing filtration assembly 600 with the filter cap 610 seated within the cavity 614 before the inner container 602 is pulled out of the outer container 604. The second ring seal 608 engages the lateral walls of the cavity 614.

Figure 10:
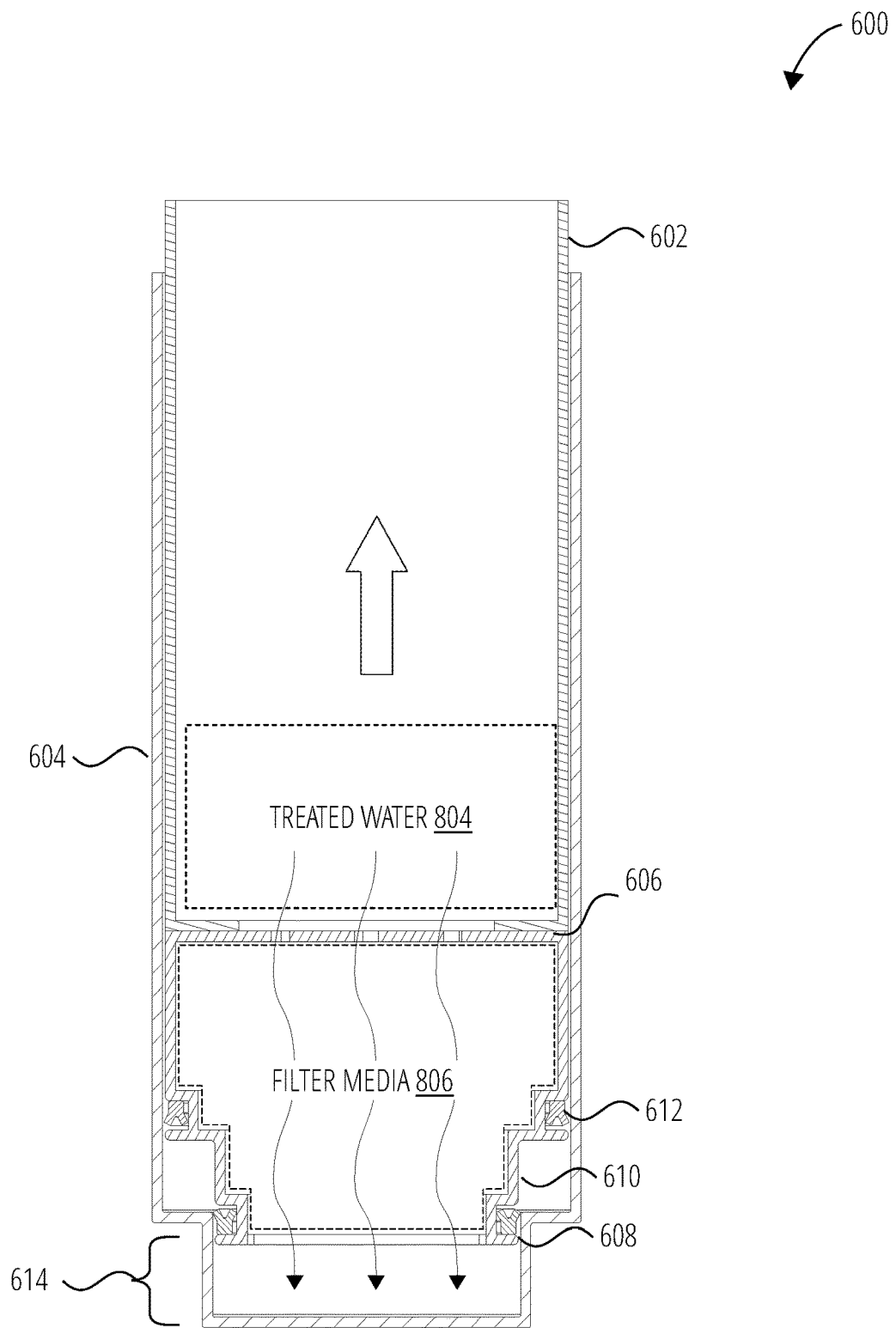
FIG. 10 illustrates a self-back flushing filtration assembly 600 in accordance with one embodiment.
Figure 11:
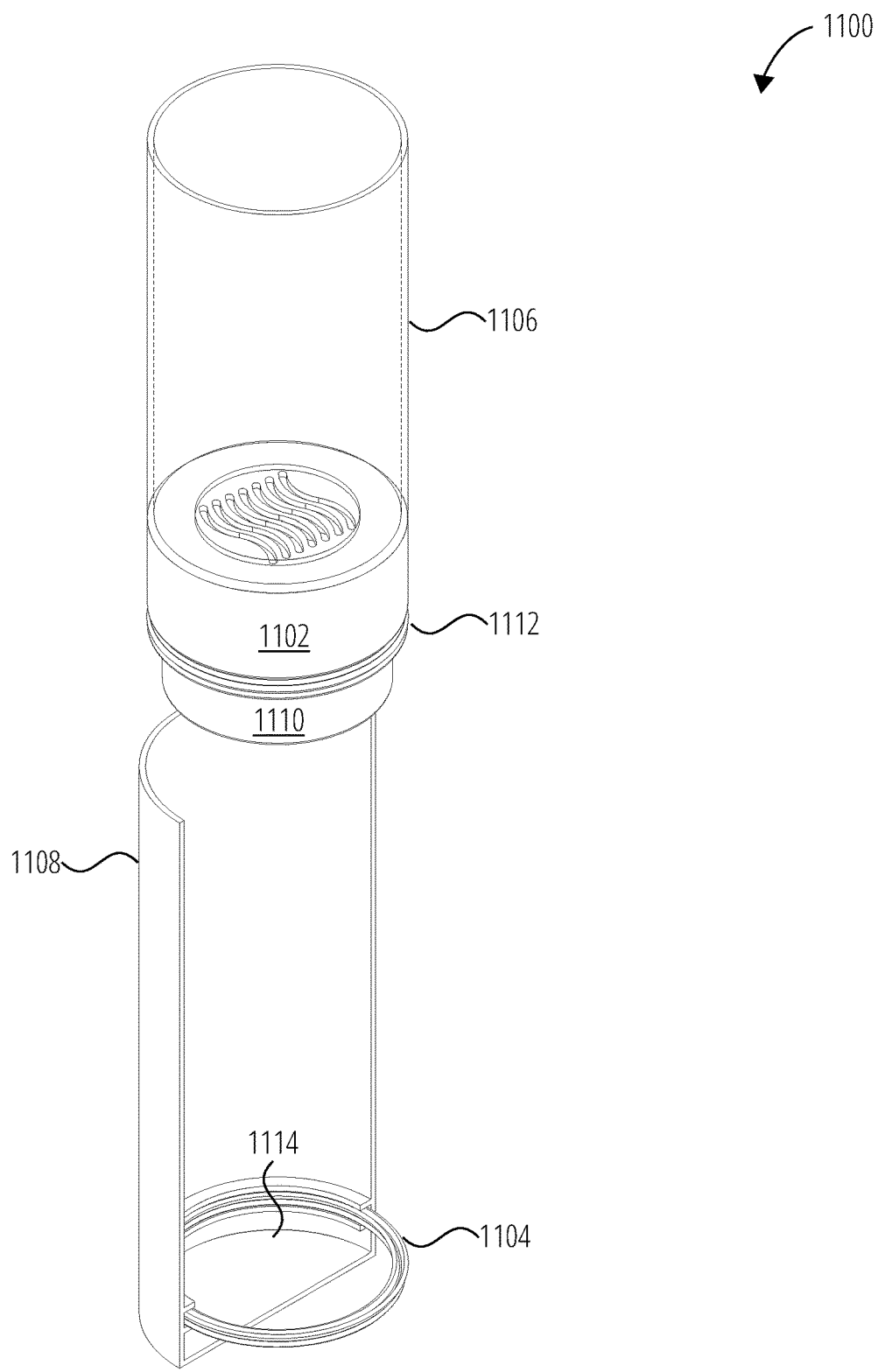
FIG. 11 illustrates a partial sectional view of a self-back flushing filtration assembly 1100 in accordance with one embodiment.
Figure 12:
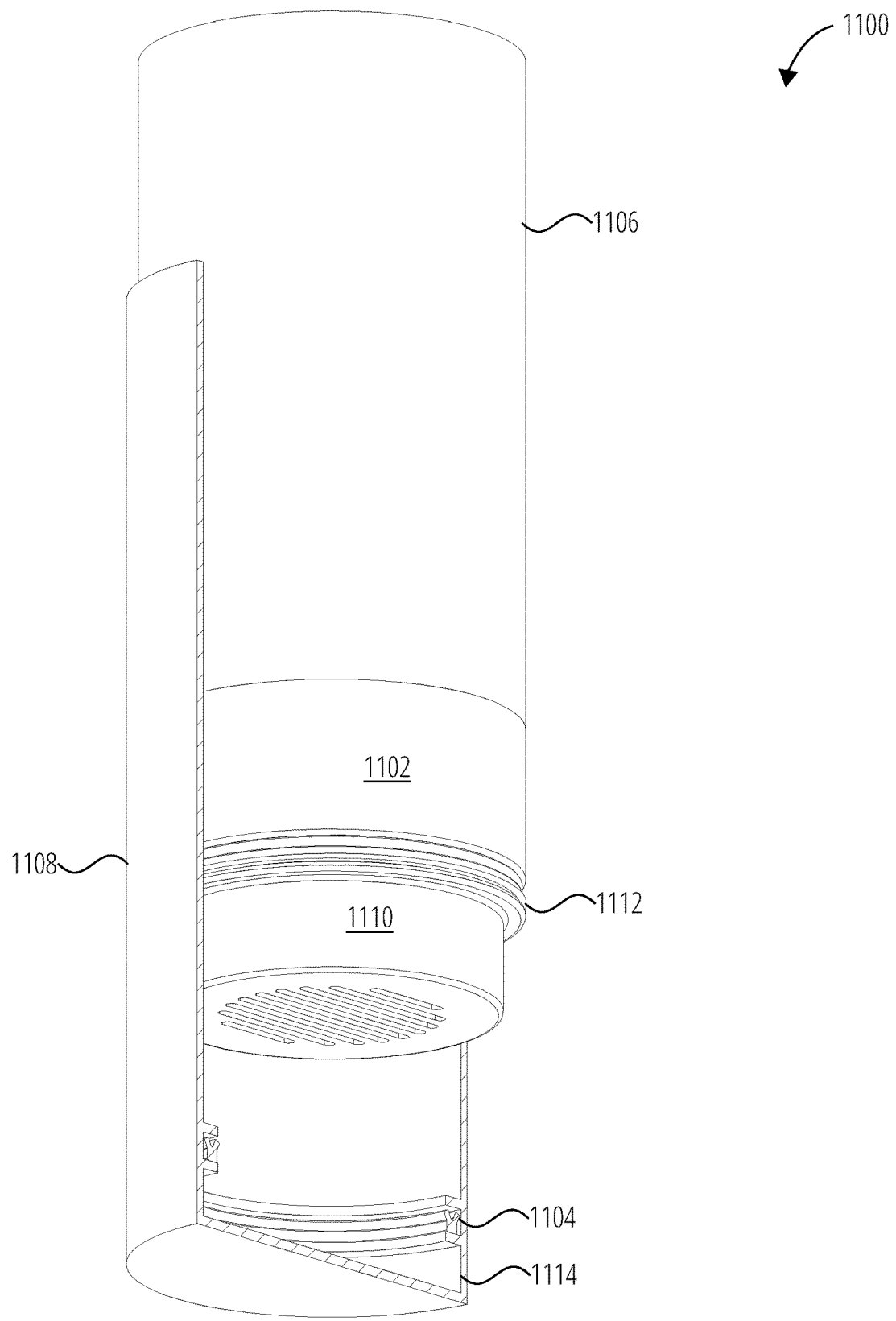
FIG. 12 illustrates a partial sectional view of a self-back flushing filtration assembly 1100 in accordance with one embodiment.

FIG. 10 illustrates the self-back flushing filtration assembly 600 as the inner container 602 and filter cartridge 606 are pulled out of the outer container 604. The second ring seal 608 may be positioned on or adjacent to the filter cap 610. The second ring seal 608 may be "Y" shaped in its crosssectional profile in order to operate as a unidirectional seal. When the forked portions of the seal are positioned facing away from the cavity 614, the second ring seal 608 forms a seal with the walls of the cavity 614 when the inner container 602 is pulled out of the outer container 604. The seal formed by the cavity 614 and the filter cap 610 creates an area of negative pressure that draws water treated water 804 or water remaining in the filter media out through the filter cap 610, effectively back flushing the filter.

FIG. 11 through FIG. 15 illustrate a self-back flushing filtration assembly 1100 comprising an inner container 1106 and an outer container 1108. The self-back flushing filtration assembly 1100 is provided as a water filtration system that forces untreated water 1304 from an outer container 1108 through a filter cartridge 1102 into an inner container 1106. When the filter cartridge 1102 is pushed to the bottom of the outer container 1108, a filter cap 1110 traverses into a cavity 1114 formed separated by a second ring seal 1104 mounted on the walls of outer container 1108. The filter cap 1110 and the cavity 1114 form a piston. In an embodiment, as the filter cartridge 1102 and the inner container 1106 are pulled out of the outer container 604, a negative pressure area is formed between the cavity 614 and the filter cap 610 that draws treated water 804 remaining in the post-filtered interstitial space of the filter cartridge 606, out of the filter media 1306, effectively back flushing the filter. In another embodiment, as the filter cartridge 606 and the inner container 602 are pulled out of the outer container 604, a negative pressure area is formed between the cavity 614 and the filter cap 610 that draws treated water 804 from the inner container 602 and/or the post-filtered interstitial space in the filter cartridge 606, effectively back flushing the filter.

The first ring seal 1112 may be positioned on the filter cartridge 1102 adjacent to the filter cap 1110. The first ring seal 1112 may be "Y" shaped in its cross-sectional profile in order to operate as a unidirectional seal. When the forked portions of the seal are positioned facing towards the cavity 1114, the first ring seal 1112 forms a seal with the walls of the outer container 1108 when the inner container 1106 is pushed towards the cavity 1114. When the inner container 1106 and the filter cartridge 1102 are retracted, the forked portions of the seal are compressed and allow air to enter the enclosed portion of the outer container 1108.

The cavity 1114 of the outer container 1108 may be portion of the outer container 1108 that is separated by the positioning of the second ring seal 1104 positioned on the walls of the outer container 1108. The positioning of the second ring seal 1104 may determine the depth of the cavity 1114 such that the volume of the cavity 1114 is sufficient to draw treated water 1302 out of the inner container 1106 and or the filter media 1306.

Figure 13:
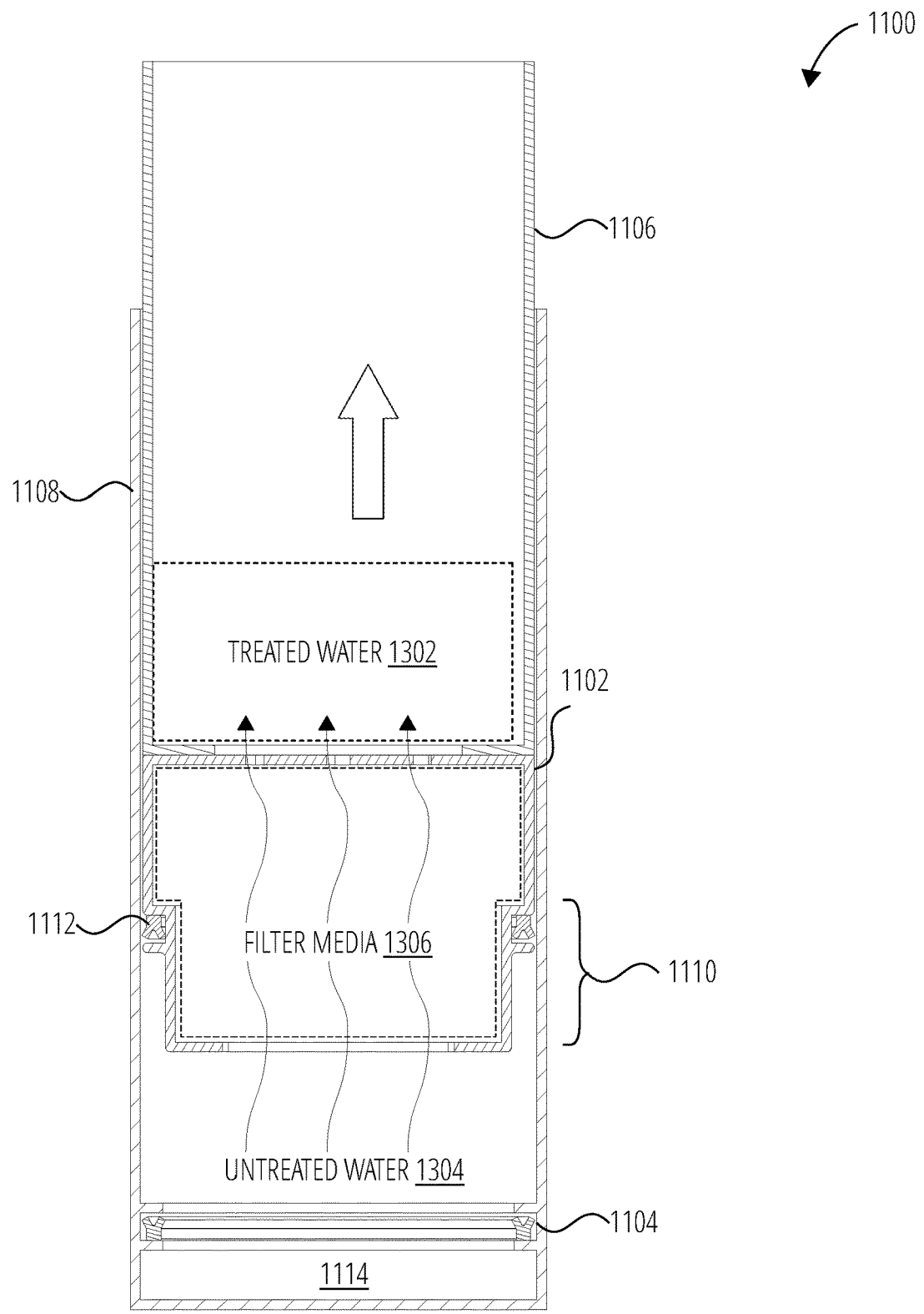
FIG. 13 illustrates a sectional view of a self-back flushing filtration assembly 1100 in accordance with one embodiment.

FIG. 13 illustrates the self-back flushing filtration assembly 1100 being operated to filter untreated water 1304 by compressing the filter cartridge 1102 and the inner container 1106 with the outer container 1108 containing untreated water 1304. When the filter cartridge 1102 and the inner container 1108 are forced into the outer container 1108, a first ring seal 1112 engages the lateral walls of the outer container 1108 forming a seal. The untreated water 1304 is then channeled through openings in the filter cap 1110 that lead to the filter media 1306. When the untreated water 1304 passes through the filter media 1306, particulates are captured by the filter media 1306 filtering the untreated water 1304. The filtered water then flows out of the filter cartridge 1102 and is collected within the inner container 1106 as treated water 1302.

Figure 14:
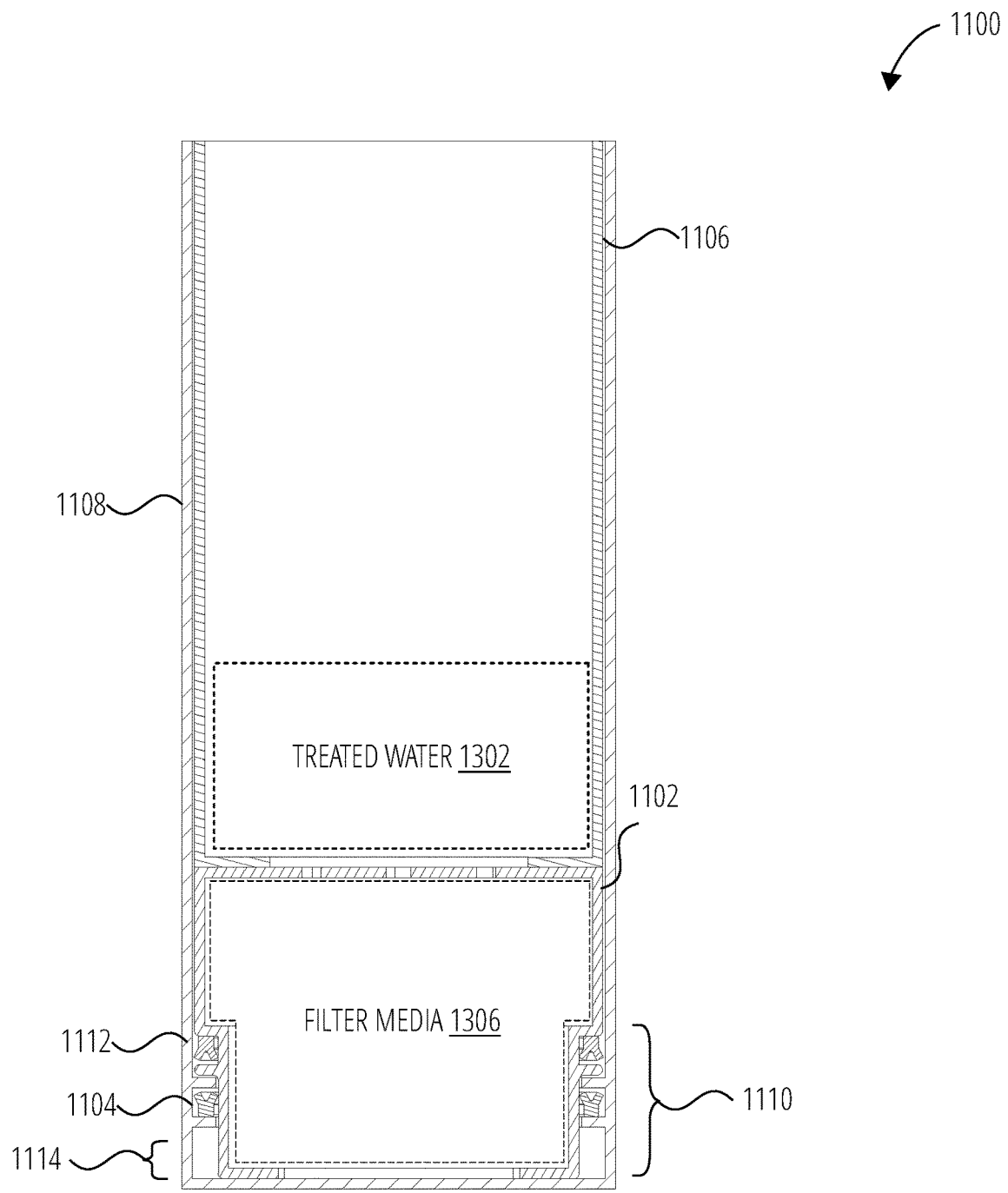
FIG. 14 illustrates a sectional view of a self-back flushing filtration assembly 1100 in accordance with one embodiment.

FIG. 14 illustrates the self-back flushing filtration assembly 1100 with the filter cap 1110 seated within the cavity 1114 before the inner container 1106 is pulled out of the outer container 1108. The second ring seal 1104 engages the lateral walls of the filter cap 1110.

Figure 15:
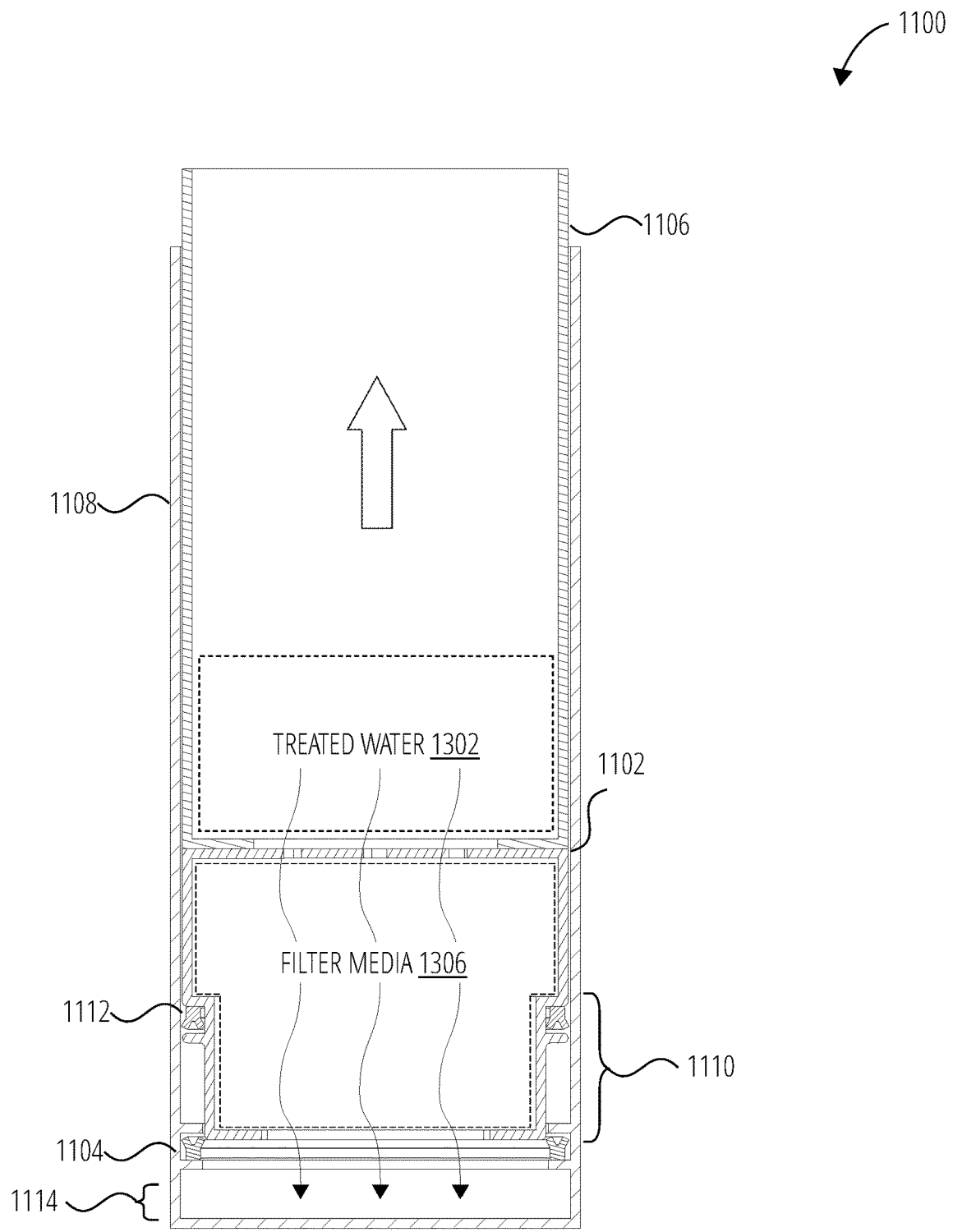
FIG. 15 illustrates a sectional view of a self-back flushing filtration assembly 1100 in accordance with one embodiment.
Figure 16:
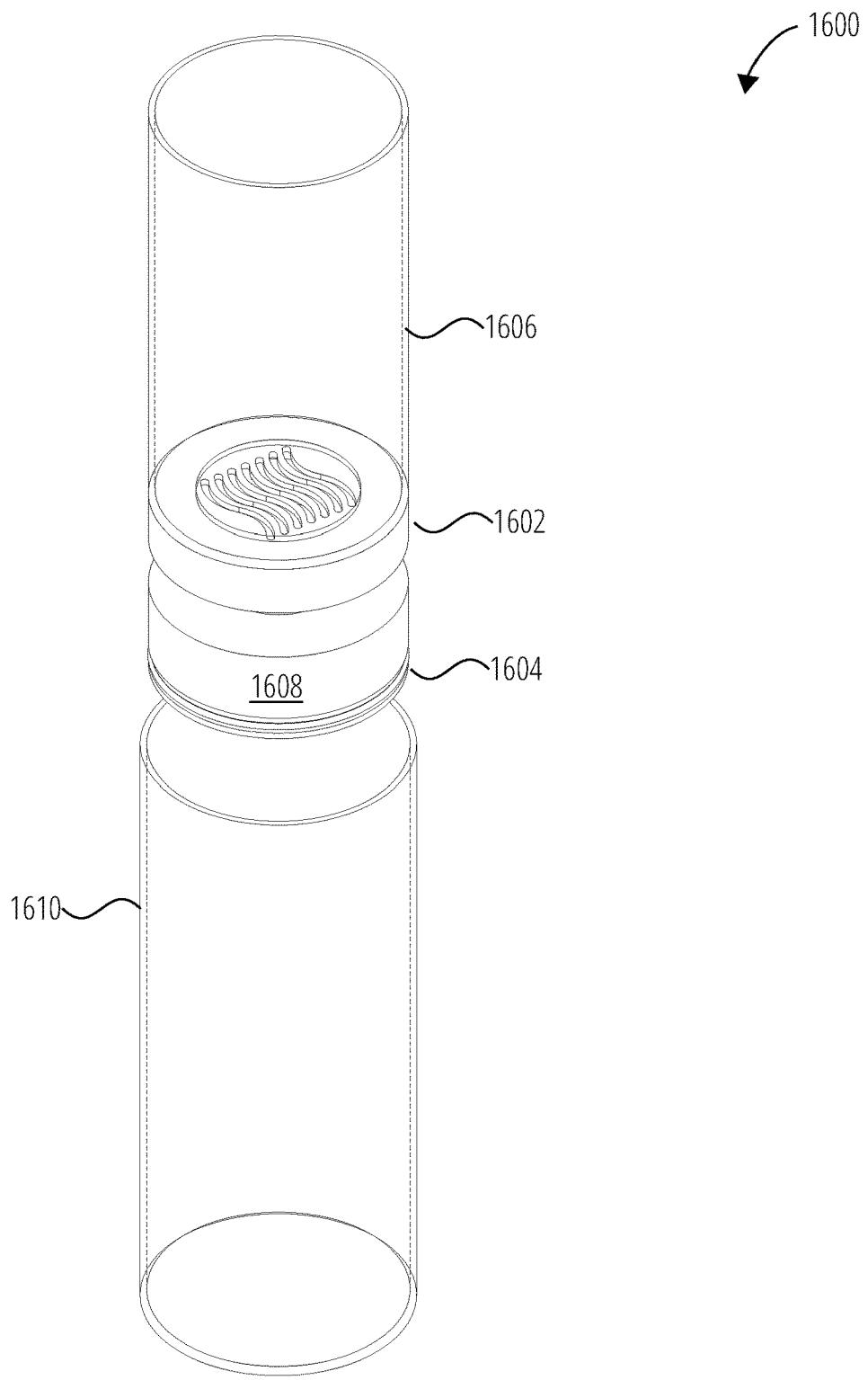
FIG. 16 illustrates a partial sectional view of a self-back flushing filtration assembly 1600 in accordance with one embodiment.
Figure 17:
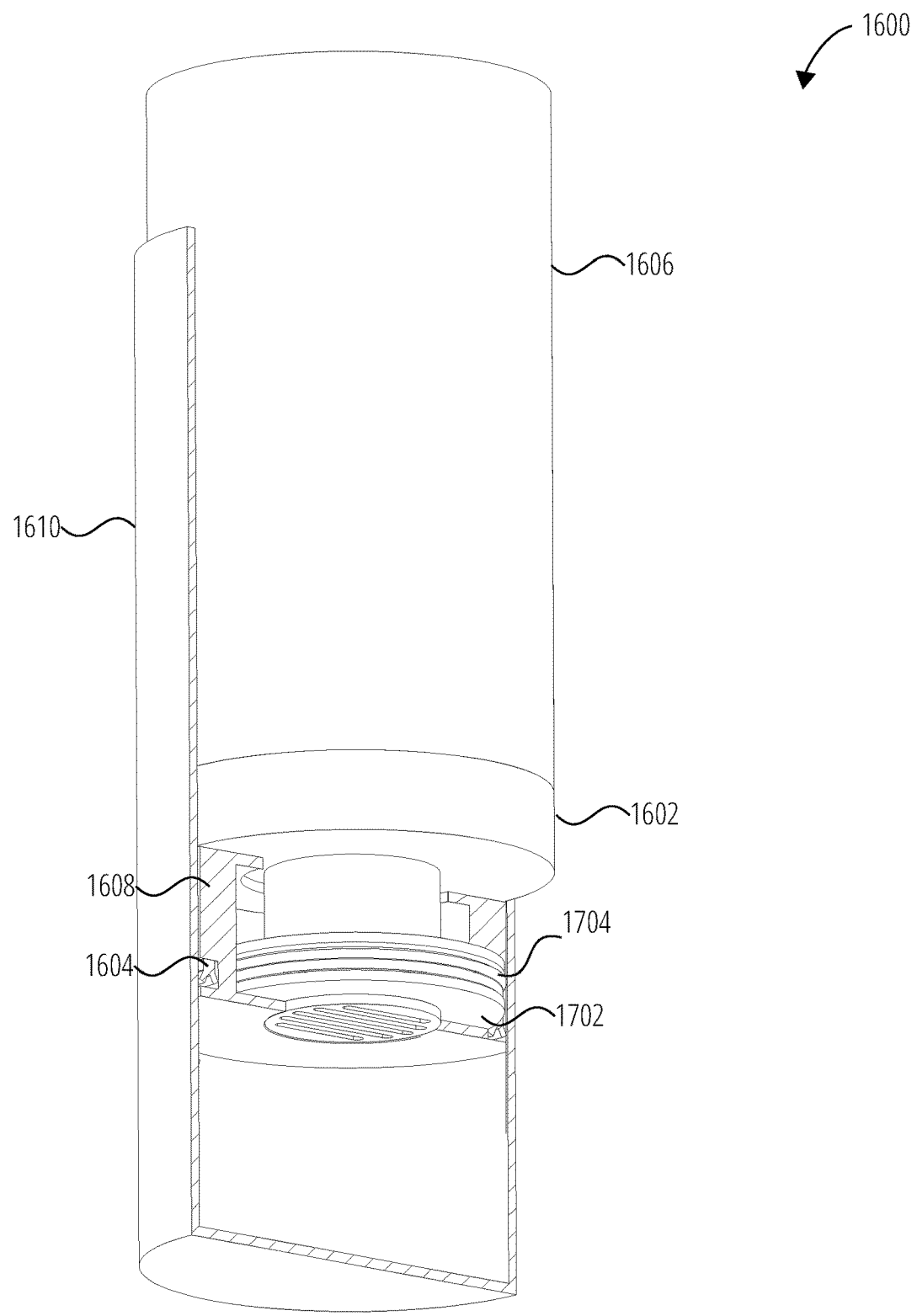
FIG. 17 illustrates a partial sectional view of a self-back flushing filtration assembly 1600 in accordance with one embodiment.

FIG. 15 illustrates the self-back flushing filtration assembly 1100 as the inner container 1106 and filter cartridge 1102 are pulled out of the outer container 1108. The second ring seal 1104 may be positioned on the lateral walls of the outer container 1108 forming the cavity 1114. The second ring seal 1104 may be "Y" shaped in its cross-sectional profile in order to operate as a unidirectional seal. When the forked portions of the seal are positioned facing towards the inner container 1106, the second ring seal 1104 forms a seal with the walls of the filter cap 1110 when the inner container 602 in pulled out of the outer container 604. The seal formed by the second ring seal 1104, the filter cap 610, and the cavity 1114 creates an area of negative pressure that draws water treated water 1302 and/or water remaining in the filter media 1306 out through opening in the filter cap 1110, effectively back flushing the filter.

FIG. 16 through FIG. 22 illustrate a self-back flushing filtration assembly 1600 comprising an inner container 1606, an outer container 1610, a filter cartridge 1602, and a back flushing base 1608. The self-back flushing filtration assembly 1600 is provided as a water filtration system that forces untreated water 1804 from an outer container 1610 through a filter cartridge 1602 into an inner container 1606. The back flushing base 1608 is moveably positioned on the filter cartridge 1602. The back flushing base 1608 surrounds a filter cap 1702 of the filter cartridge 1602 and prevents the back flushing base 1608 from separating from the filter cartridge 1602. When the filter cartridge 1602 and inner container 1606 are pushed to the bottom of the outer container 1610, the filter cap 1702 pushes the back flushing base 1608 to the bottom. When the filter cartridge 1602 and inner container 1606 are pulled out of the outer container 1610, filter cap 1702 moves away from the back flushing base 1608 forms a cavity 2002 of negative pressure. In an embodiment, as the filter cartridge 1602 and the inner container 1606 are pulled out of the outer container 1610, a cavity 2002 of negative pressure is formed between the back flushing base 1608 and the filter cap 1702 that draws treated water 1802 remaining in the post-filtered interstitial space of the filter cartridge 1602, out of the filter media 1806, effectively back flushing the filter. In another embodiment, as the filter cartridge 1602 and the inner container 1606 are pulled out of the outer container 1610, a cavity 2002 of negative pressure is formed between the back flushing base 1608 and the filter cap 1702 that draws treated water 1802 from the inner container 1606 and/or the post-filtered interstitial space in the filter cartridge 1602, effectively back flushing the filter.

A back flushing base seal 1604 may be positioned on the back flushing base 1608. The back flushing base seal 1604 may be "Y" shaped in its cross sectional profile in order to operate as a unidirectional seal. When the forked portions of the seal are positioned facing towards the bottom of the outer container 1610, the back flushing base seal 1604 forms a seal with the walls of the outer container 1108 when the inner container 1106 is pushed towards the bottom. When the inner container 1606 and the filter cartridge 1602 are retracted, the forked portions of the seal are compressed and allow air to enter the enclosed portion of the outer container 1610.

A first ring seal 1704 may be positioned on the filter cartridge 1602 adjacent to or on the filter cap 1702. The first ring seal 1704 may be "Y" shaped in its cross-sectional profile in order to operate as a unidirectional seal. When the forked portions of the seal are positioned facing away from the bottom of the outer container 1610, the first ring seal 1704 forms a seal with the interior walls of the back flushing base 1608 when the inner container 1606 in pulled out of the outer container 1610. When the inner container 1606 and the filter cartridge 1602 are pushed into to the outer container 1610, the forked portions of the seal are compressed allowing the filter cap 1702 to engage an inner lip of the back flushing base 1608 in order to push it towards the bottom.

Figure 18:
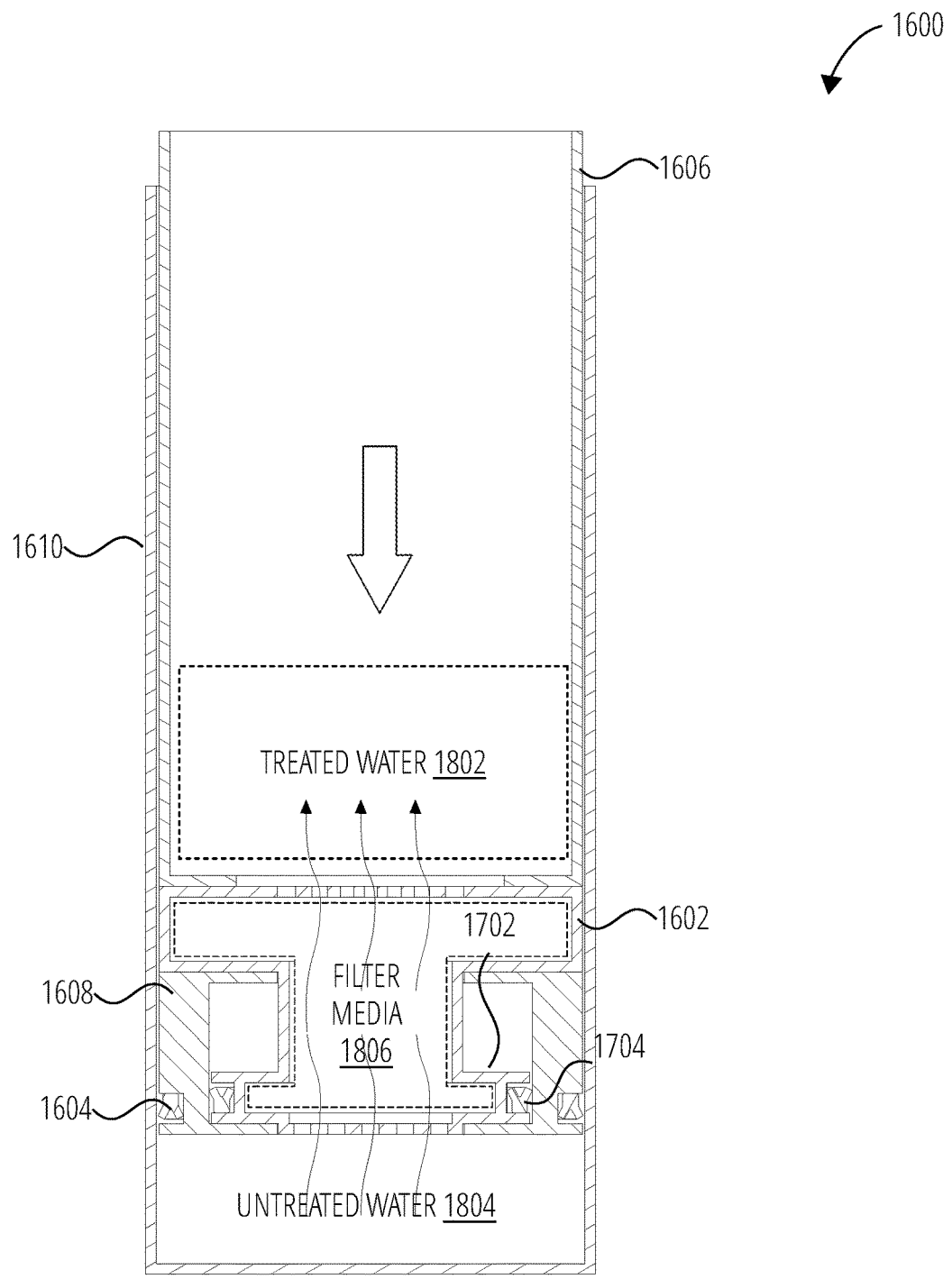
FIG. 18 illustrates a sectional view of a self-back flushing filtration assembly 1600 in accordance with one embodiment.

FIG. 18 illustrates the self-back flushing filtration assembly 1600 being operated to filter untreated water 1304 by compressing the filter cartridge 1602 and the inner container 1606 with the outer container 1610 containing untreated water 1804. When the filter cartridge 1602 and the inner container 1610 are forced into the outer container 1610, a back flushing base seal 1604 engages the lateral walls of the outer container 1610 forming a seal. The untreated water 1804 is then channeled through openings in the filter cap 1702 that lead to the filter media 1806. When the untreated water 1304 passes through the filter media 1806, particulates are captured by the filter media 1806 filtering the untreated water 1304. The filtered water then flows out of the filter cartridge 1602 and is collected within the inner container 1606 as treated water 1802.

Figure 19:
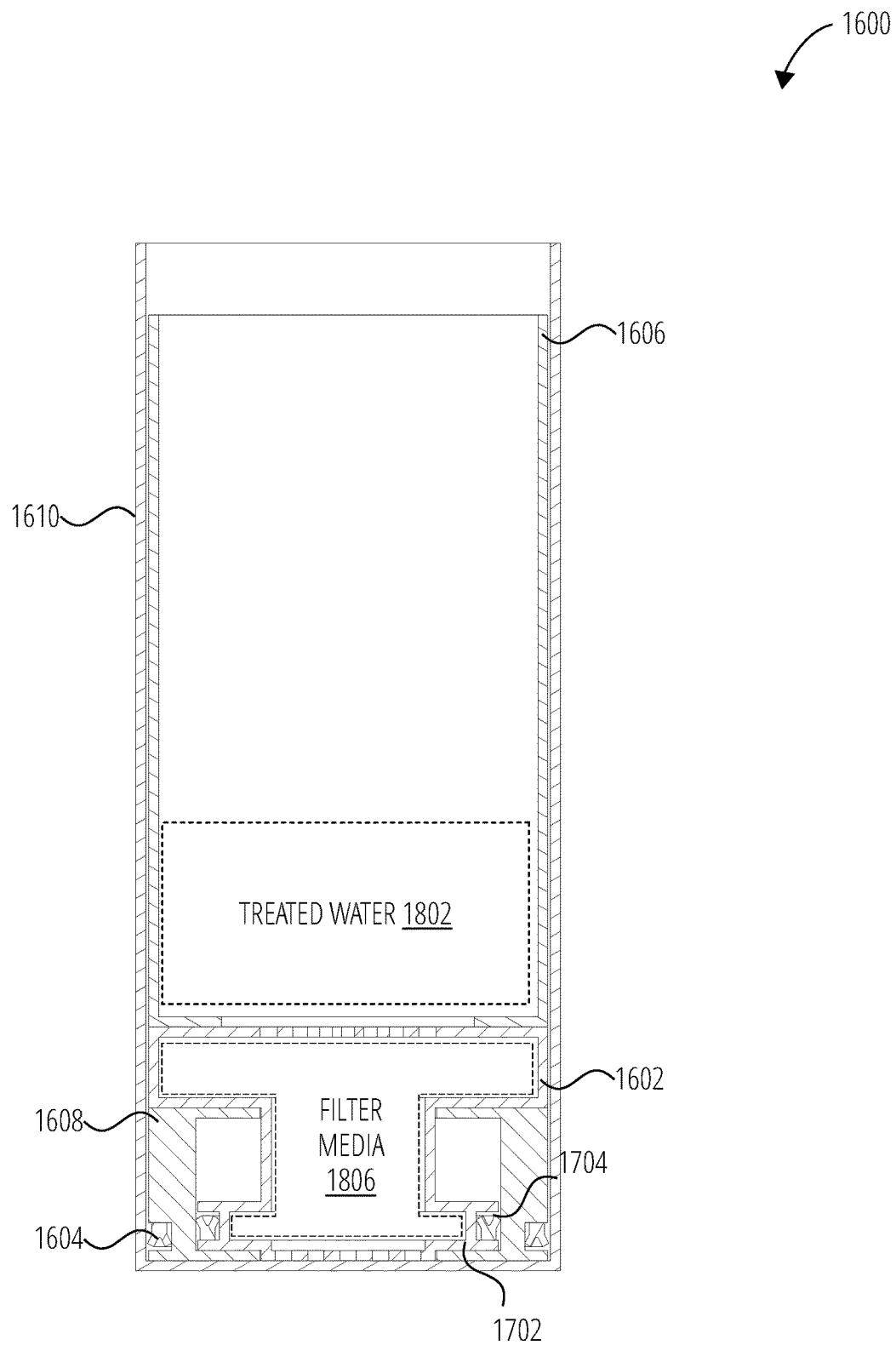
FIG. 19 illustrates a sectional view of a self-back flushing filtration assembly 1600 in accordance with one embodiment.

FIG. 19 illustrates the self-back flushing filtration assembly 1600 as the filter cartridge 1602 and the back flushing base 1608 are seated at the bottom of the inner container 1606.

Figure 20:
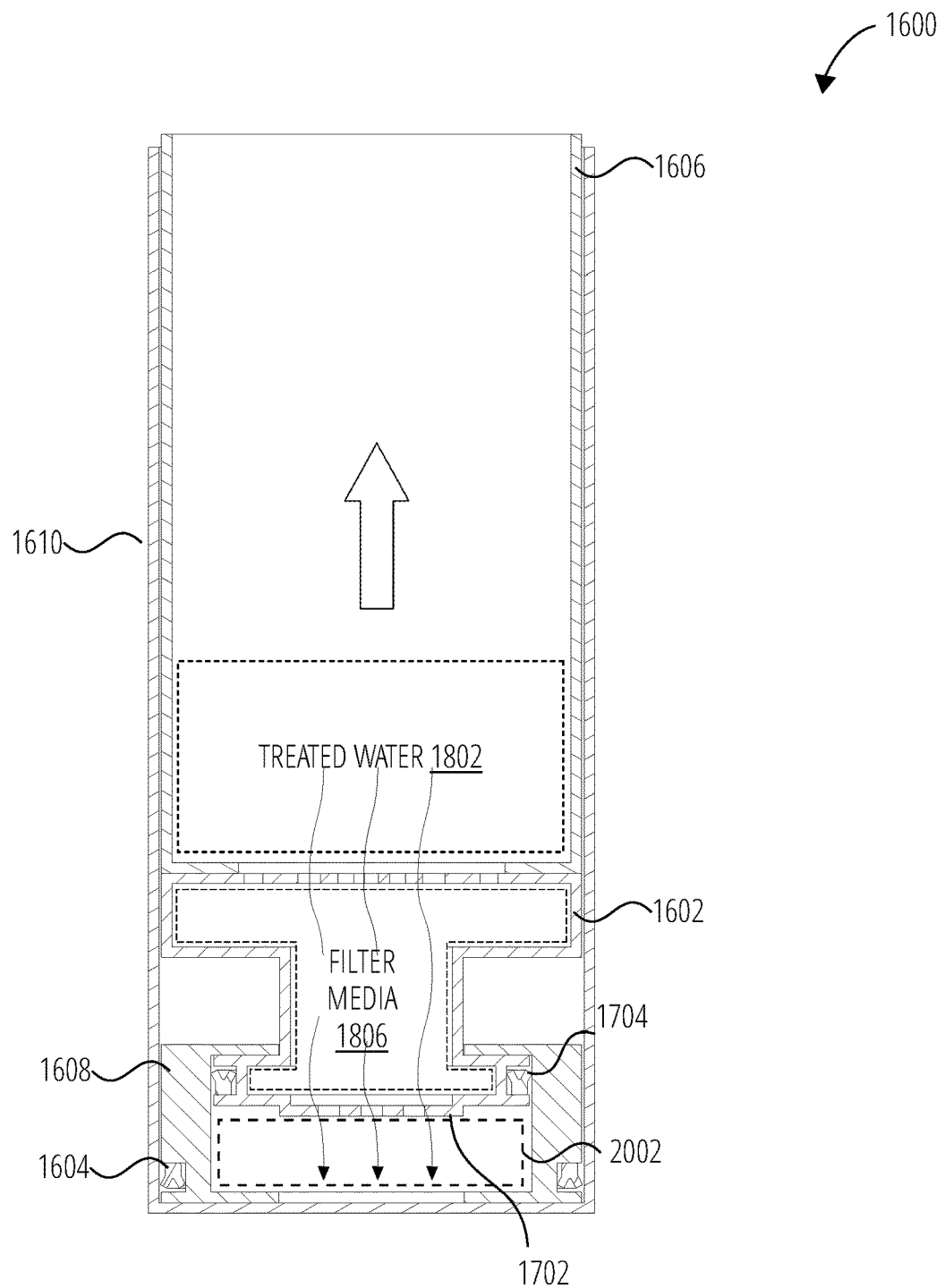
FIG. 20 illustrates a sectional view of a self-back flushing filtration assembly 1600 in accordance with one embodiment.

FIG. 20 illustrates the self-back flushing filtration assembly 1600 as the inner container 1606 and filter cartridge 1602 are pulled out of the outer container 1610. The filter cap 1702 moves within the back flushing base 1608 away from the bottom of the outer container 1610 and forms the cavity 2002 of negative pressure. The cavity 2002 of negative pressure may be formed when the filter cap 1702 pulls away from the back from the back flushing base 1608. The internal dimensions of the back flushing base 1608 may determine the distanced traveled by the filter cap 1702 within the back flushing base 1608. The distance traveled by the filter cap 1702 may determine the volume of the cavity 2002 of negative pressure formed and may be configured to be sufficient to draw treated water 1802 out of the inner container 1606 and/or the filter media 1806.

Figure 21:
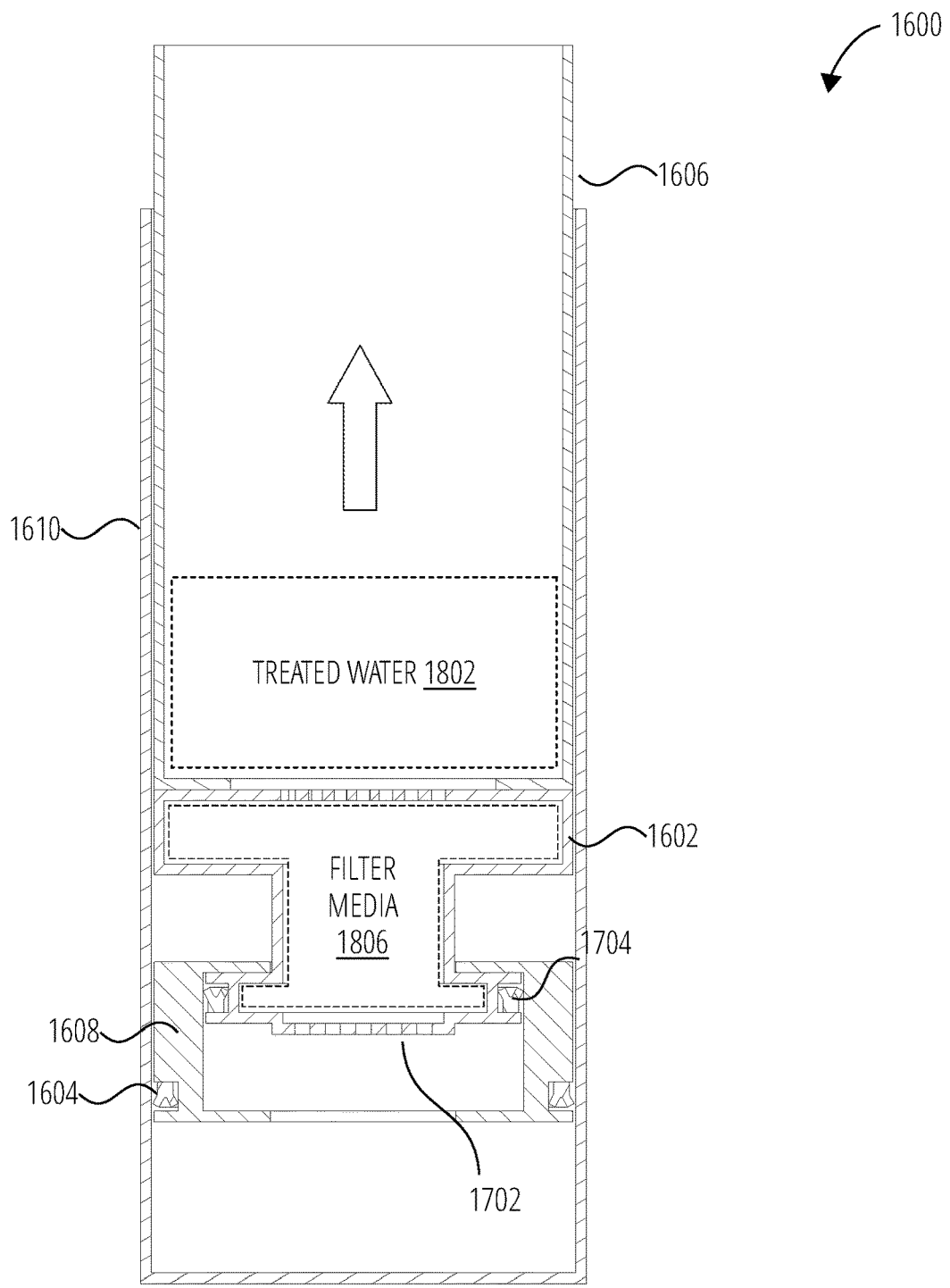
FIG. 21 illustrates a sectional view of a self-back flushing filtration assembly 1600 in accordance with one embodiment.
Figure 22:
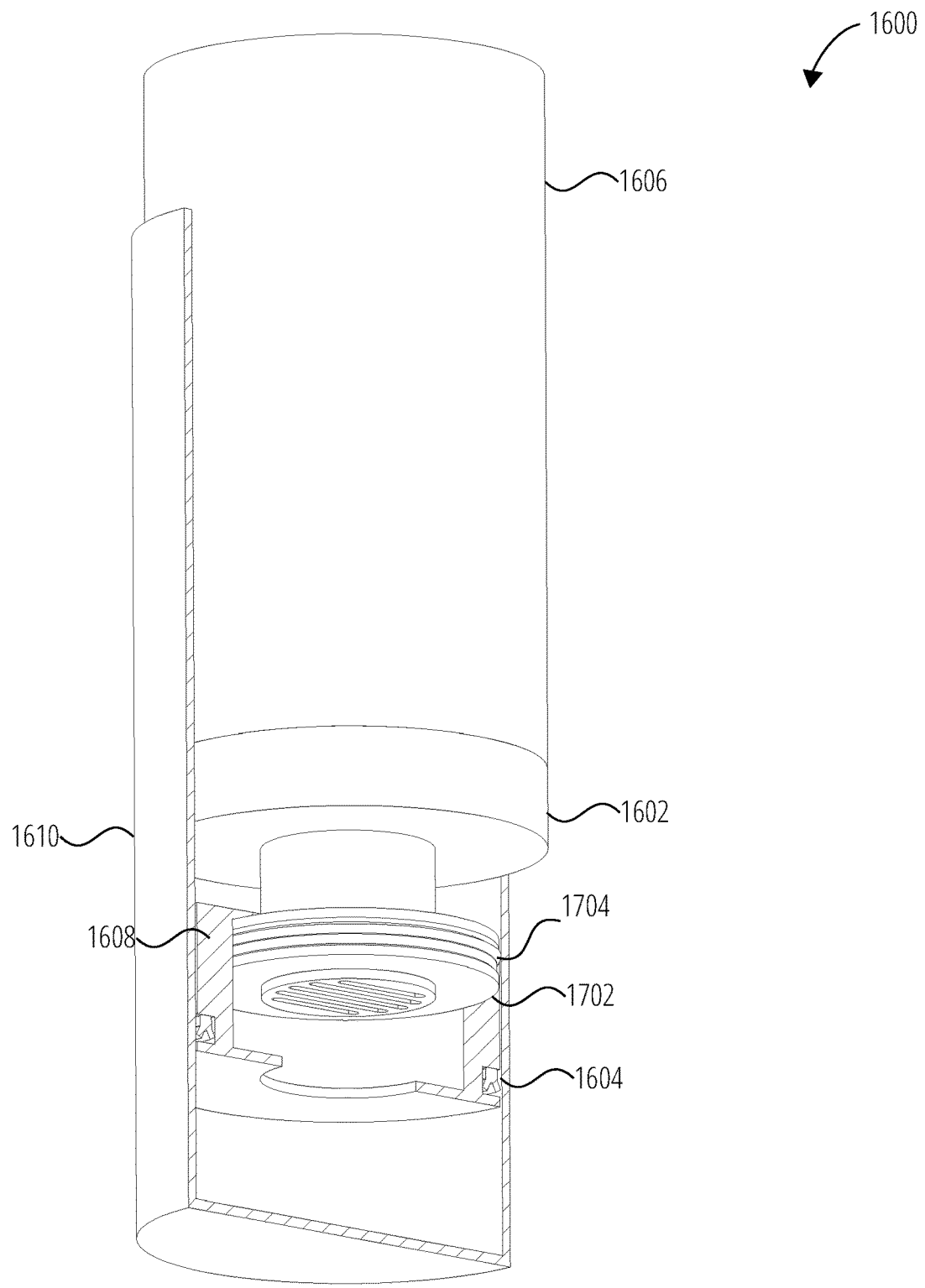
FIG. 22 illustrates a partial sectional view of a self-back flushing filtration assembly 1600 in accordance with one embodiment.

FIG. 21 illustrates the self-back flushing filtration assembly 1600 as the inner container 1606 and filter cartridge 1602 are pulled out of the outer container 1610 and the filter cap 1702 begins to move the back flushing base 1608 away from the bottom of the outer container 1610. As the back flushing base 1608 moves away from the bottom of the outer container 1610, the back flushing base seal 1604 compresses and allows air to enter the space beneath the back flushing base 1608.

The apparatuses and methods in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Having thus described embodiments of the present invention of the present application in detail and by reference to illustrative embodiments thereof, it will be apparent that modifications and variations are possible without departing from the scope of the present invention.

What is claimed is:

1. A method comprising:
   operating a self-back flushing filtration assembly to filter untreated water, the self-back flushing filtration assembly including:
      an inner container configured to receive treated water by way of a filter cartridge, wherein the filter cartridge comprises filter media to capture particles and a first seal;
      an outer container configured to hold the untreated water and sleeve the filter cartridge and the inner container;
      the inner container and the filter cartridge moveably positioned within the outer container to compress and draw the untreated water through the filter media within the filter cartridge by way of a filter cap, wherein the filter cap or the outer container comprises a second seal, wherein the untreated water is sealed between the filter cartridge and a cavity of the outer container by way of the first seal on the filter cartridge; and
      the filter cap movably positioned within the cavity of the outer container to draw the treated water from the inner container or a treated portion of the filter media, through the filter media of the filter cartridge, wherein the cavity is sealed by the second seal on the filter cap or the outer container, and
   operating the self-back flushing filtration assembly to draw the treated water from the inner container or treated portion of the filter media, through the filter media of the filter cartridge, thereby dislodging captured particles from the filter media.

2. The method of claim 1, wherein operating the self-back flushing filtration assembly to draw the treated water from the inner container or the treated portion of the filter media, through the filter media of the filter cartridge, creates a negative pressure between the filter cartridge and the cavity.

3. The method of claim 2, wherein the negative pressure is created by moving the second seal in a direction out of the cavity, wherein the second seal is in contact with a portion of the cavity.

4. The method of claim 1, wherein the first seal and the second seal are unidirectional seals.

5. The method of claim 1, wherein the first seal and the second seal are opposing unidirectional seals.

6. The method of claim 1, with the proviso that the self-back flushing filtration assembly does not include a check valve.

* * * * *